(12) United States Patent
Huen et al.

(10) Patent No.: US 12,490,116 B2
(45) Date of Patent: *Dec. 2, 2025

(54) COMMUNICATION NETWORK WITH NODES ARRANGED AS A SYNTHETIC WIDE AREA BASE STATION AND REPEATER NETWORK

(71) Applicants: Tat-Sing Huen, Danville, CA (US); Yee Chun Lee, Millbrae, CA (US); Huei Meng Chang, Milpitas, CA (US)

(72) Inventors: Tat-Sing Huen, Danville, CA (US); Yee Chun Lee, Millbrae, CA (US); Huei Meng Chang, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,196

(22) Filed: Jan. 14, 2025

(65) Prior Publication Data
US 2025/0159497 A1    May 15, 2025

Related U.S. Application Data

(63) Continuation of application No. 18/965,550, filed on Dec. 2, 2024, now Pat. No. 12,302,125, which is a
(Continued)

(51) Int. Cl.
H04W 84/02 (2009.01)
H04W 16/32 (2009.01)
(Continued)

(52) U.S. Cl.
CPC ........... H04W 16/32 (2013.01); H04W 40/32 (2013.01); H04W 84/22 (2013.01)

(58) Field of Classification Search
CPC ........ H04B 7/02; H04B 7/024; H04B 7/0413; H04B 7/0452; H04B 7/0495;
(Continued)

(56) References Cited

U.S. PATENT DOCUMENTS 5,890,055 A    3/1999   Chu et al.
7,653,394 B2   1/2010   McMillin
(Continued)

FOREIGN PATENT DOCUMENTS

EP         2353325 B1     4/2016
WO      2013187752 A1    12/2013

OTHER PUBLICATIONS

Kirthiga et al., "Performance Studies and Review of Millimeter Wave MIMO Beamforming at 60 GHZ", Procedia Technology, Aug. 2015, pp. 658-666, vol. 21.
(Continued)

*Primary Examiner* — Frank Duong

(57) ABSTRACT

A system comprises a wireless network comprising (1) first nodes that serve as a synthetic wide area base station for communicating data with a mobile handset and (2) second nodes that serve as a repeater network for propagating the data going to or from the synthetic wide area base station. The mobile handset includes multiple antennas that point in different directions. Different ones of the first nodes communicate the data to or from the mobile handset via wireless signals in accordance with the antennas' directionality. The wireless signals share the same frequency, encode the data, and are (1) respectively received by the different first nodes from different ones of the antennas or (2) respectively transmitted by the different first nodes for reception by different ones of the antennas. The nodes propagate the data via multiple paths through the wireless network as millimeter wave wireless signals that provide time-shifted representations of the data.

20 Claims, 12 Drawing Sheets

Related U.S. Application Data continuation of application No. 18/517,616, filed on Nov. 22, 2023, now Pat. No. 12,160,754, which is a continuation of application No. 16/386,254, filed on Apr. 16, 2019, now Pat. No. 11,871,248, which is a continuation-in-part of application No. 15/798,243, filed on Oct. 30, 2017, now Pat. No. 10,298,463.

(60) Provisional application No. 62/414,786, filed on Oct. 30, 2016.

(51) Int. Cl.
  *H04W 40/32* (2009.01)
  *H04W 84/22* (2009.01)

(58) Field of Classification Search
  CPC ... H04J 11/0026; H04J 11/003; H04L 1/0048; H04L 1/06; H04L 12/24; H04L 12/28; H04L 12/4604; H04L 41/0806; H04L 41/12; H04L 41/142; H04W 16/28; H04W 16/32; H04W 40/32; H04W 56/001; H04W 64/003; H04W 84/02; H04W 84/04; H04W 84/12; H04W 84/22; H04W 88/06
  See application file for complete search history.

(56) References Cited

U.S. PATENT DOCUMENTS

| | | | |
|---|---|---|---|
| 8,779,921 B1 | 7/2014 | Curtiss | |
| 8,897,340 B2* | 11/2014 | Negus | H04B 7/0486 375/211 |
| 9,094,119 B2 | 7/2015 | Huen et al. | |
| 9,094,908 B1 | 7/2015 | Shor et al. | |
| 9,794,854 B2 | 10/2017 | Hart et al. | |
| 10,009,065 B2 | 6/2018 | Henry et al. | |
| 10,084,515 B2* | 9/2018 | Ferrante | H04B 7/0452 |
| 10,129,778 B2 | 11/2018 | Ashrafi | |
| 10,149,311 B2 | 12/2018 | Hart et al. | |
| 10,298,463 B2 | 5/2019 | Lee et al. | |
| 10,382,992 B2* | 8/2019 | Sahin | H04W 16/30 |
| 10,397,803 B2* | 8/2019 | Sahin | H04W 24/02 |
| 11,122,587 B2* | 9/2021 | Roy | H04W 72/20 |
| 11,871,248 B2 | 1/2024 | Lee et al. | |
| 12,160,754 B2 | 12/2024 | Huen et al. | |
| 2007/0059986 A1 | 3/2007 | Rockwell | |
| 2011/0305200 A1 | 12/2011 | Schoofs et al. | |
| 2012/0154071 A1 | 6/2012 | Bradley et al. | |
| 2014/0321282 A1 | 10/2014 | Pragada et al. | |
| 2014/0334295 A1 | 11/2014 | Guichard et al. | |
| 2016/0134356 A1 | 5/2016 | Rappaport et al. | |
| 2016/0211856 A1 | 7/2016 | Muhammad et al. | |
| 2016/0236637 A1 | 8/2016 | Krishna et al. | |
| 2017/0156153 A1 | 6/2017 | Hart et al. | |

OTHER PUBLICATIONS

Niu et al, "A Survey of Millimeter Wave (mmWave) Communications for 5G: Opportunities and Challenges", IEEE, Feb. 2015, 17 pages.
Okasaka et al., "Proof-of-Concept of a Millimeter-Wave Integrated Heterogeneous Network for 5G Cellular", Sensor, 2016, 21 pages.
Prosecution History for U.S. Appl. No. 15/798,243, filed Oct. 30, 2017, now U.S. Pat. No. 10,298,463, granted May 21, 2019.
Prosecution History for U.S. Appl. No. 16/386,254, filed Apr. 16, 2019, now U.S. Appl. No. 11,871,248, granted Jan. 9, 2024.
Prosecution History for U.S. Appl. No. 18/517,616, filed Nov. 22, 2023, now U.S. Pat. No. 12,160,754, granted Dec. 3, 2024.
Rappaport et al., "Millimeter Wave Mobile Communications for 5G Cellular: It Will Work!", IEEE, May 29, 2013, pp. 335-349, vol. 1.
Sakaguchi et al., "Millimeter-Wave Wireless LAN and Its Extension toward 5G Heterogeneous Networks", IEICE Transactions on Communications, Oct. 2015, 17 pages, vol. E98-B, No. 10.
Swindlehurst et al., "Millimeter-Wave Massive MIMO: The Next Wireless Revolution?", IEEE, Sep. 2014, pp. 56-62.
Zhu et al., "A Performance Evaluation of 60 GHz MIMO Systems for IEEE 802.11ad WPANs", IEEE, 2011, 5 pages.
Notice of Allowance for U.S. Appl. No. 18/965,550 dated Jan. 14, 2025.

* cited by examiner

COMMUNICATION NETWORK WITH NODES ARRANGED AS A SYNTHETIC WIDE AREA BASE STATION AND REPEATER NETWORK

CROSS-REFERENCE TO RELATED APPLICATIONS

This patent application is a continuation of U.S. patent application Ser. No. 18/965,550, filed Dec. 2, 2024, and entitled "Communication Network with Base Station Nodes and Repeater Nodes for Wirelessly Communicating Data Between the Base Station Nodes and a Multi-Antenna Mobile Handset", now U.S. Pat. No. 12,302,125, which is a continuation of U.S. patent application Ser. No. 18/517,616, filed Nov. 22, 2023, and entitled "Communication Network with Control Plane Network", now U.S. Pat. No. 12,160,754, which is a continuation of U.S. patent application Ser. No. 16/386,254, filed Apr. 16, 2019, and entitled "Communication Network with Control Plane Network", now U.S. Pat. No. 11,871,248, which is a continuation-in-part (CIP) of U.S. patent application Ser. No. 15/798,243 filed Oct. 30, 2017, now U.S. Pat. No. 10,298,463, which claims priority to U.S. Provisional Patent Application Ser. No. 62/414,786, filed Oct. 30, 2016. The entire disclosures of the Ser. No. 18/517,616, 16/386,254, and 62/414,786 patent applications are incorporated herein by reference

DETAILED DESCRIPTION

Figure 1:
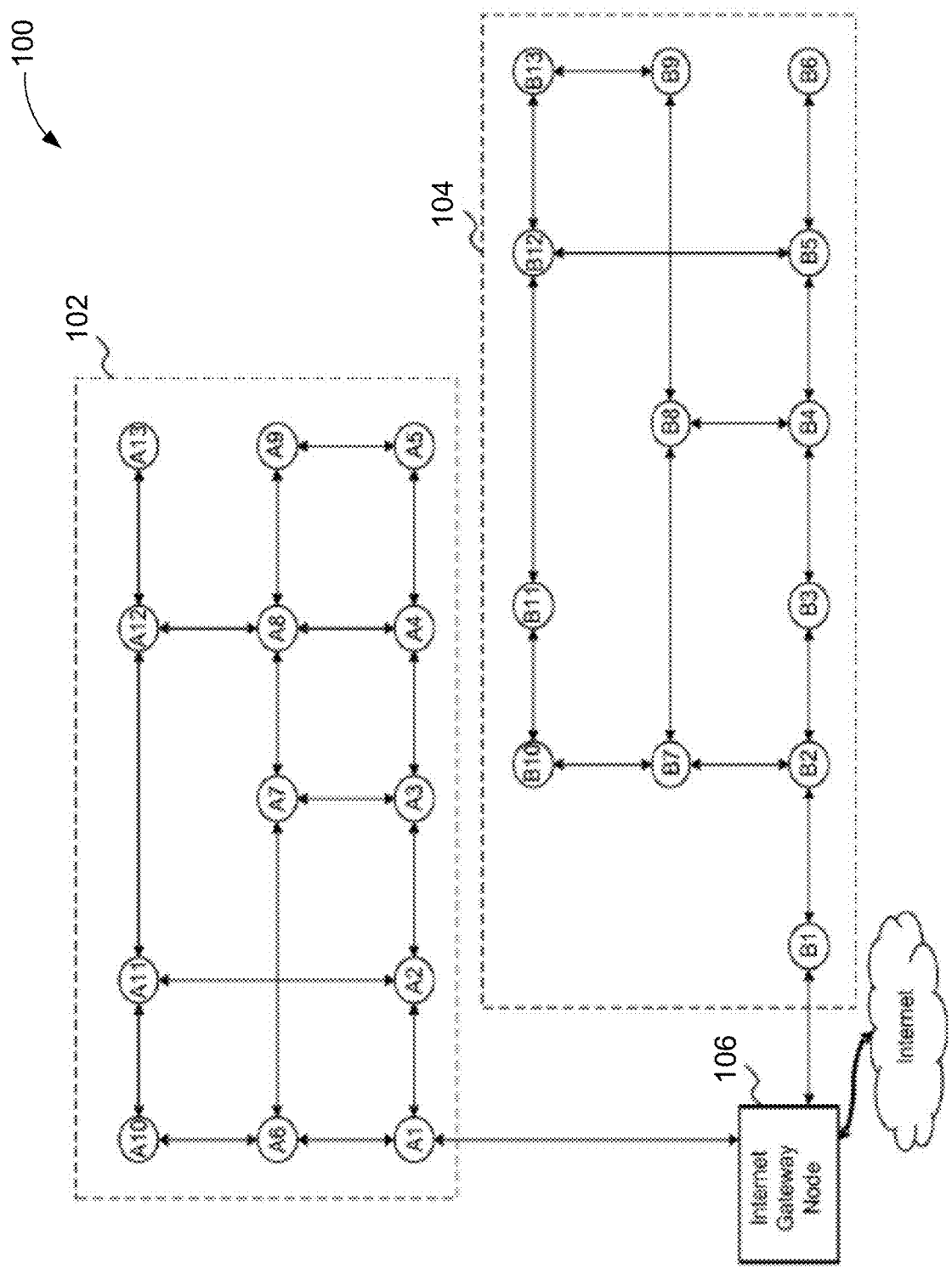
FIG. 1 is a diagram illustrating an example of a topology of communication network having co-linear nodes and rectilinear nodes.

FIG. 1 is a diagram illustrating an example of a topology of communication network 100 having co-linear nodes and rectilinear nodes. The communication network 100 comprises clusters 102 and 104 with thirteen nodes in each cluster and internet gateway node 106 to provide internet access to the nodes. Typical deployment can have as many as two thousand or more nodes within each cluster, interconnected via wireless links, where each node can be spaced apart a predefined distance, e.g., fifty meters to two hundred and fifty meters.

In some embodiments, each of nodes A1-A13 and B1-B13 can be connected to street lamps, thereby fixing each node to a specific geographic location with a substantially regular interval. Because many modern streets are positioned along straight lines and a substantially regular interval, the poles on the same street are generally positioned along a linear signal path and a substantially regular interval. To leverage this ideal placement, nodes can be coupled to street poles along a linear signal path of the regular interval. Thereby, nodes can be positioned collinearly and transmit signals generated either by a directional RF antenna or other directional EM transmitter to each other. Thus, a self-backhauling capability is established that can be used for the network of luminaries, for ancillary functions of a smart grid network, for metro mobile internet access, as well as back-hauling capacity for cellular 4G networks, emerging 5G networks, and for other applications. There can also be other street lamps and other objects between any two nodes since poles are typically as close as twenty meters apart, depending on the lighting requirement of the city landscape.

As is illustrated, some nodes can be positioned along a linear signal path. See, e.g., nodes B1-B6 of the cluster 104. In a specific implementation, a millimeter-wave signal (e.g., 60 MHz) is repeated from node to node. A node, such as node B6, may receive the transmitted millimeter-wave signal from multiple nodes, such as node B5, B4, B3, B2, and/or B1. Assuming node B6 receives node B4's transmission, the received signal at node B5 and the received signal at node B6 may slightly differ due to attenuation and the relative distances of nodes B5 and B6 from node B4. Node B6 will also receive a transmission of the signal from node B5 as well. Since node B6 has two transmissions of the signal (one transmission from node B4 and another transmission from node B5), node B6 can apply a correlation method to the received signals to obtain a strengthened, correlated signal and to reduce the interference by the multiple transmissions of the signal. If there are any other nodes interconnected to node B6 that have not received the signal, then node B6 transmits the correlated signal to those other interconnected nodes. Thus, correlation is performed on the signal as a function of the respective distances of the interconnected nodes, signal processing delay at each of the interconnected nodes, and the respective attenuation of the multiple transmissions. If those other interconnected nodes receive any of the other transmissions from node B4 and/or node B5, then those other interconnected nodes can also apply a correlation method to the multiple transmissions of the signal that is received.

Once node B5 receives a second signal, a symbol-time signal having one or more bits per symbol that is transmitted from node B4, the second signal can be down converted. Depending on how a first signal was transmitted, the second signal can be down-converted to baseband from a signal or can be converted from a signal to an electrical baseband signal. The second signal can have attenuation due to free space loss, atmospheric absorption, foliage or other factors, and has a propagation delay of tp1. Symbol-time second signal is then filtered, signal processed, and amplified (as a third signal with a time delay of tp1+Δp, where Δp is the signal processing delay of a node). The third signal is then up-converted to radio frequency (and/or converted from an electrical signal to an optical signal), and transmitted to other interconnected nodes (e.g., node B6).

Since nodes are co-linear, a fourth signal received at node B6 is a composite of the first signal from node B4 (with additional signal attenuation and propagation delay of tp1+tp2) and the third signal from node B5 (with signal attenuation and propagation and processing delay of tp1+tp2+Δp). The fourth signal is processed with signal correlation at node B6 to obtain a correlated fifth signal using signal processing ("SF") techniques, similar to echo cancellation or other SP techniques. Ideally, correlation operates on an analog signal without conversion to a digital format since conversion to a digital format would increase the latency delay.

Clusters 102 and 104 can have a total bandwidth of 1 Gbps or more Ethernet traffic. The topology of the communication network 100 is such that traffic originating from internet gateway node 106 travels to each of the nodes of clusters 102 and 104. Each node of clusters 102 and 104 repeats the analog signal originated by internet gateway node 106 to other interconnected nodes. Since the nodes do not store and forward any packets, the latency to deliver data is extremely small. The active links in clusters 102 and 104 can be determined by a predefined method, for instance a spanning tree method or an alternative method, such that the mesh topology forms a tree structure without loops. Cluster 102 and 104 can have a leaf-trunk convention, where a trunk direction is towards internet gateway node 106 and a leaf direction is towards a node.

A major criterion of the mesh network is that each node of clusters 102 and 104 is able to receive data traffic from internet gateway node 106. One or more of the nodes A1-A13 and B1-13 should also be co-linear so that some co-linear nodes can receive multiple transmissions of that repeated signal for correlation. Furthermore, nodes A1-A13 and B1-B13 can be wirelessly or with-wire connected to end user devices via Wi-Fi or via Ethernet with a single or multiple physical wire connections, such that the end users can access the internet via the internet gateway node 106.

A point-to-multipoint directional beam can also be used to reinforce the signal that is transmitted from multiple co-linear and/or rectilinear nodes by repeating the same signal in a coherent manner. Each subsequent transmission of the signal from node to node can be correlated and strengthened to improve the overall range of the network and to reduce interference by the multiple transmissions of the signal.

The mesh network can thereby be scaled with as many or more than 2,000 nodes (which is a least 20 to 50 times the nodal size of conventional Wi-Fi mesh access point solution without the reduction of effective traffic payload speed associated with packet latency). This large network size scaling can be attributed to quick repeating of an up-converted RF signal and/or free space optical signal to baseband electrical signals and back to up-converted RF signal and/or free space optical signal without the use of packet store and forwarding.

Figure 2:
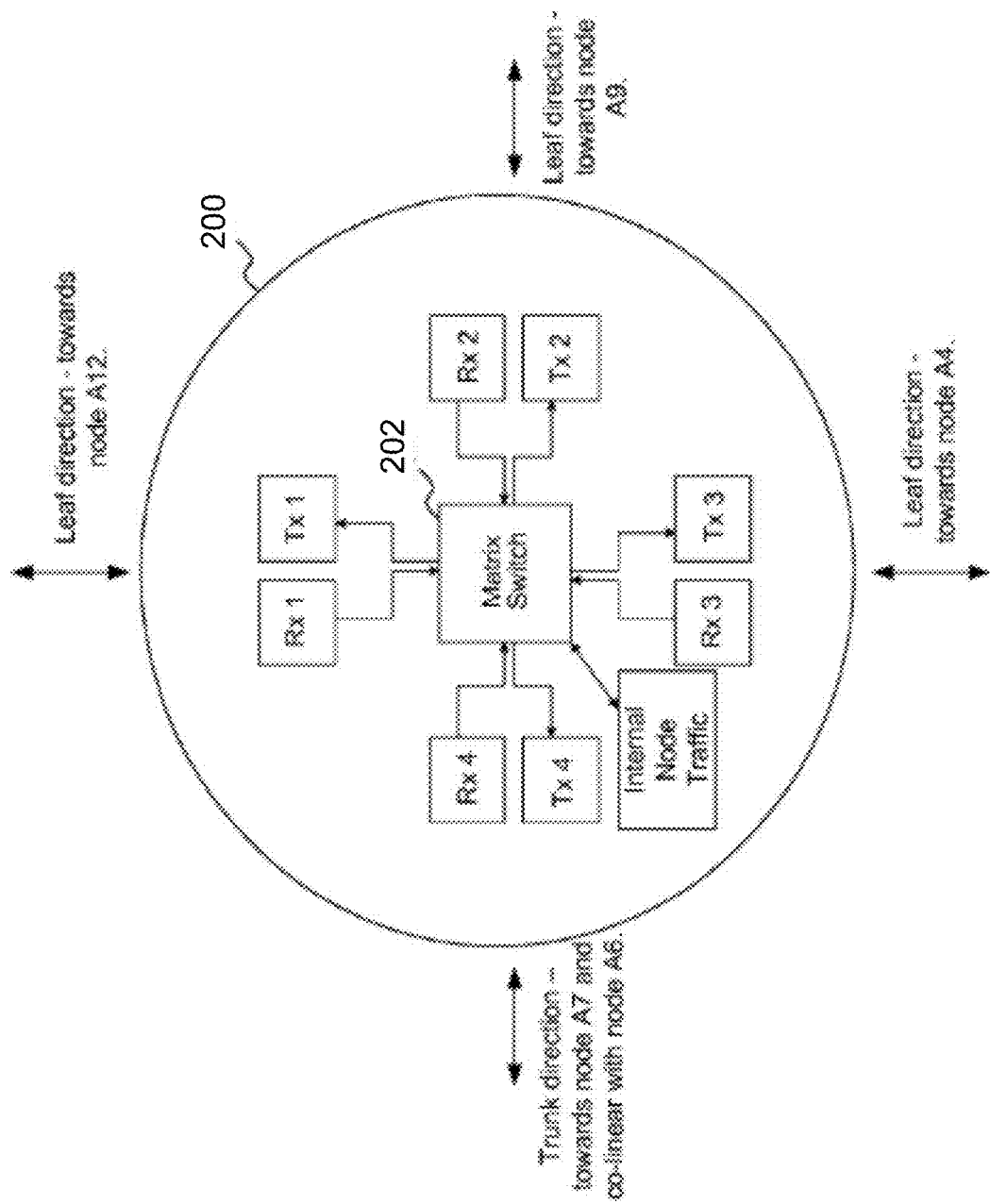
FIG. 2 is a block diagram illustrating an example of a node of a digital Infinite Impulse Response (IIR) repeater network according to some embodiments.

FIG. 2 is a block diagram illustrating an example of a node 200 of a digital Infinite Impulse Response (IIR) repeater network according to some embodiments. The node 200 comprises transmitters Tx1-Tx4, receivers Rx1-Rx4, and a matrix switch 202. The matrix switch 202 directs the data flow for the transmitters Tx1-Tx4, the receivers Rx1-Rx4, and any internal node traffic. The internal node traffic can comprise telemetry information (including diagnostic data of the respective node and the network) and external backhauling traffic from a Wi-Fi mesh access point ("AP") or from a gigabit Ethernet port 1000 Base-T.

Since the mesh topology forms a tree structure without loops, the matrix switch 202 can be reconfigured to orient the transmitters Tx1-Tx4 and the receivers Rx1-Rx4 in accordance with the network topology and link directions. In some embodiments, the matrix switch 202 can be a logic circuit that connects one of the receivers of a node to one of the transmitters of that node to retransmit a signal that was received to one or more active links with other interconnected nodes. For instance, if the receiver Rx4 receives a signal that is to be retransmitted via active links that are supported by the transmitters Tx1 and Tx2, then the matrix switch 202 will route the received signal from the receiver Rx4 to the transmitters Tx1 and Tx2 to be transmitted to other nodes via the active links. Assuming the transmitter Tx3 does not support an active link, then the transmitter Tx3 will not transmit the received signal. Furthermore, the matrix switch 202 may also correlate all inbound traffic in the co-linear direction to retransmit a correlated signal to the other nodes.

Figure 3:
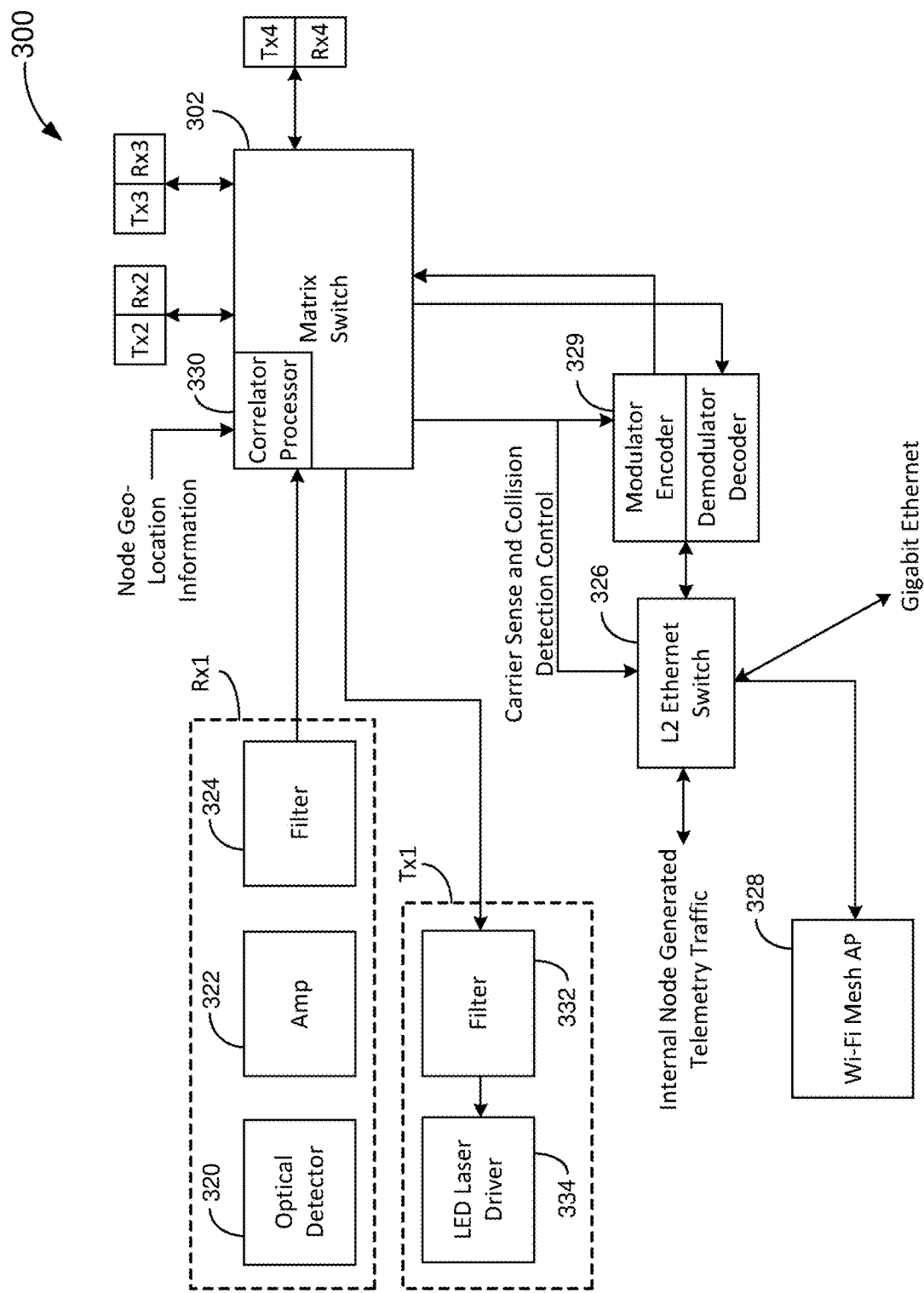
FIG. 3 is a block diagram illustrating an example of a conventional node using free space optics to transmit and receive signals.

FIG. 3 is a block diagram 300 illustrating an example of a conventional node using free space optics to transmit and receive signals. A node can comprise optical transmitters Tx1-Tx4, optical receivers Rx1-Rx4, and a matrix switch 302 having a correlator processor 330. Here, the receivers Rx1-Rx4 comprise logic blocks for optical to electrical conversion and the transmitters Tx1-Tx4 comprise logic blocks for electrical to optical conversion to generate the free space optical signal.

For the receiver Rx1, an optical detector 320 is used to detect a laser signal from either an adjacent node and/or from a co-linear node beyond the adjacent node. Once the optical signal is converted to an electrical signal, the converted electrical signal is amplified by an amplifier 322 and then filtered by a filter 324. The filtered signal is then input to the matrix switch 302. The matrix switch 302 transmits the filtered signal to downstream or upstream nodes using any of its transmitters after pulse-shape filtering by a filter 332, and then converting the filtered signal to an optical signal via an LED laser diode driver 334. The transmitters Tx1-Tx4 and the receivers Rx1-Rx4 can have similar hardware implementations and operate on the same optical wavelength.

Internal node generated traffic such as telemetry data and/or ancillary traffic from video camera, audio microphones, and other devices connected to the node can be digitized and packetized according to IP protocols. Those packets can be fed to a gigabit Ethernet layer 2 switch 326 via a Wi-Fi logic block 328 or any other connection means. The layer 2 switch 326 has controls from the correlator processor 330 from within the matrix switch 302 to throttle the first-in-first-out ("FIFO") within the layer 2 switch 326 so that traffic collisions can be avoided.

Packet signals coming out of the layer 2 switch 326 are sent to the modulator/encoder+demodulator/decoder 329, which conforms to standard gigabit Ethernet packets. The digital signals are then modulated and encoded for transmission to any of the transmitters Tx1-Tx4 of the node. The direction of the digital signals can be determined by the configuration of the matrix switch 302. The correlator processor 330 can time align multiple received signals from either a co-linear direction or rectilinear direction to form a strengthened, correlated signal and to reduce interference by the multiple transmissions of the signal. The alignment is aided by information of the geo-location of the nodes within the cluster. The geo-location data can be used to determine co-linearity of neighboring nodes and the relative distances between nodes. This information is used to determine the phase shift and signal level of nodes to form a correlated, strengthened pulse signal and to reduce interference from the multiple transmissions. The correlator processor 330 can also determine signals that are non-correlated and thus make a decision as to whether to send the correlated signal forward or to decide that there is a collision during this pulse signal timeframe.

In addition to the optical signals, electromagnetic waves of a millimeter-wave frequency range is employed for data communication. At a millimeter-wave frequency range (e.g., 60 GHz), even a path length difference of 4 micron can lead to a one-degree phase shift for signal propagation within a silicon substrate (of which dielectric permeability is about 11.9) of a repeater node. This would not be a major issue if an analogue repeater, including an on-chip antenna for reception and an on-chip antenna for transmission, were implemented within the same substrate (same chip) of the repeater node, because it is possible to control a trace length between the on-chip antennas with high enough precision to ensure phase coherency for proper repeater operation. However, this would violate a requirement that an RX (received) signal and an amplified TX (transmitted) signal be isolated from each other by at least 100 dB to prevent an aversive positive feedback, which would saturate the receiver's low-noise amplifier (LNA).

In a multi-chip implementation where the RX and TX sides of the repeater are embedded in distinct chips with a physical separation that is large enough to provide enough RF shielding to satisfy the 100 dB isolation requirement would lead to uncontrolled phase uncertainty as well as a frequency-dependent propagation delay up to 1 ns. In a typical subcarrier (OFDM) modulation scheme, the maximum propagation delay in a long repeater chain (5 or more repeater nodes) could be comparable to the symbol length for multi-gigabit data transmission, which results in a severe distortion/degradation of the combined signals, requiring use of sophisticated time domain equalization to recover the original signal on a receiving end. In addition, the delay and delay spread are further impacted by inevitable reflections by various impedance mismatches and discontinuities, especially where a feed line is connected to the on-chip antenna. Even for a good antenna Voltage Standing Wave Ratio (VSWR) of 1.5, about 20% of the signal voltage, or 4% of the signal power is reflected. Although a 4% reflected power at the feed point does not seriously reduce the antenna transmission efficiency, the reflected wave will couple to the power amplifier (PA) of the transmitter to distort the output (of the PA). The resulting reverberation will greatly increase the unwanted delay spread.

In a dense repeater deployment, an inter-node spacing could be as small as 40 m, and each copy (phase warped and time delayed) of an original signal will have a similar magnitude. This makes use of a Finite Impulse Response (FIR) equalization filter ineffective, which in turn mandates employment of an adaptive IIR tap-delayed equalization filter. However, such a filter cannot be easily implemented in a strictly analogue way because while the IIR equalization filter itself can be done entirely in an analogue domain, the adaptive algorithm of the IIR equalization filter must be done in a digital domain, which would entail use of ultra-high-speed analogue-to-digital converter (ADC). The analogue IIR equalizer is also not suited for tap length of more than 10 nodes because of its intrinsic numerical instability. The complexity of the analogue IIR filter is further compounded by the fact that at least two taps for each network node in a chain are needed to accurately model a propagation delay spreads created by each node.

In view of the issues discussed above, various embodiments described herein are directed to provide configuration of a digital-IIR repeater network applicable for communicating signals, such as millimeter-wave signals, between nodes of the digital-IIR repeater network. Millimeter-wave signals have strong directivity and applicable to short-range communication, such as the communication between street lumps. Millimeter-wave signals in this paper are intended to represent signals in a frequency range of 20-100 GHz, for example about 60 GHz, which is a license free frequency range. For fundamental architecture of the digital-IIR repeater network, applicable architecture is disclosed in U.S. Pat. No. 9,094,119, the entire contents of which are incorporated herein by reference.

1. Digital Infinite Impulse Response (IIR) Approach

According to some embodiments, to implement a digital equalization scheme, an IIR filter is implemented in the digital domain, after A-to-D (analog to digital) conversion. Further, to achieve the digital equalization scheme, a direct conversion (zero IF) architecture may be employed, because this architecture can be a most feasible frequency conversion architecture suited for a millimeter-wave frequency range. In the direct conversion architecture, output of an ADC can be already at a baseband (BB) level, and therefore it is feasible to use a digital signal processor (DSP) to implement a digital IIR filter. The digital-IIR coefficients can be specified by their respective amplitudes and phases. If we assume that the minimum distance between two mesh nodes is 20 m, then if the geographical location of the mesh network nodes can be determined to within 5 cm, then the amplitude of the IIR coefficients can be estimated to within a +/−0.5% accuracy, which would be more than sufficient even for a large mesh network. For a short network, the phase of the mesh node IIR coefficients can't be reliably determined by geolocations alone, but accuracy can be increased in real-time using the phase and symbol clock synchronization mechanism described later in this paper.

Figure 4:
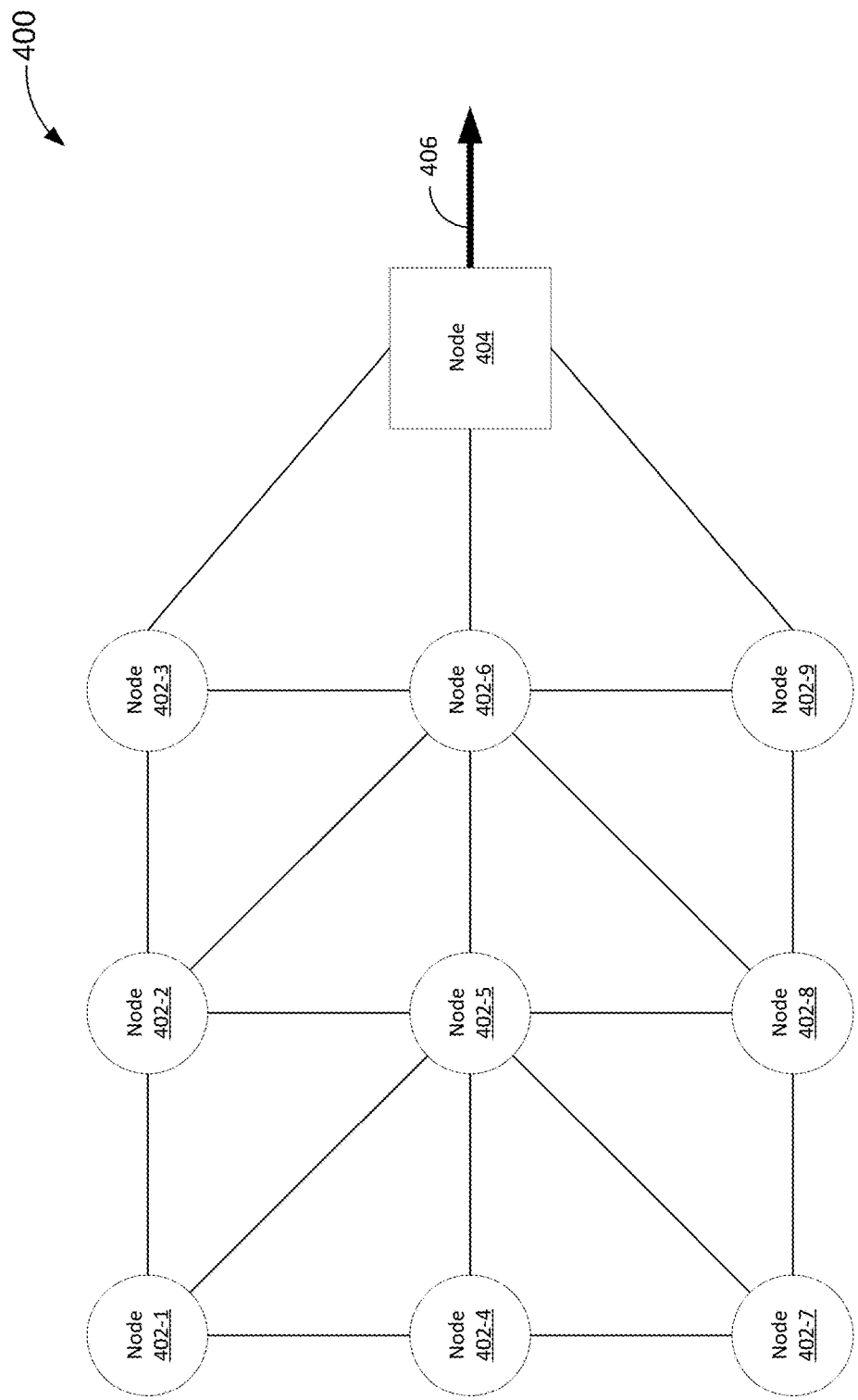
FIG. 4 is a block diagram of nodes in a repetitive pattern.

FIG. 4 is a block diagram 400 of nodes in a repetitive placement pattern. In the diagram 400, nodes 402-1 to 402-9 (collectively, the nodes 402) are intended to represent a repetitive placement pattern. The repetitive pattern in the example of FIG. 4 is square, but other repetitive patterns, such as rectangular, hexagonal, or the like, can be used. A node generating a simplified signal must be aware of the form of the repetitive placement pattern to utilize certain simplification techniques, such as IIR filtering.

In the example of FIG. 4, the node 404 is intended to represent a node that correlates a plurality of signals from a corresponding plurality of nodes (a subplurality of the nodes 402) when the plurality of signals are all a transmission or re-transmission of a signal from a single source node (e.g., a wireless device coupled to the mesh via a wireless link, a gateway node, or the like). The node 404 generates a simplified signal generated using a function of respective distances of the subplurality of the nodes 402 in the repetitive placement pattern. The function may also take into account signal processing delay at the subplurality of nodes 402 and attenuation associated with the signal transmission from the subplurality of nodes 402.

The arrow 406 is intended to represent a simplified signal corresponding to correlation of the plurality of signals from the subplurality of the nodes 402. It may be noted, the lines connecting the nodes 402 with one another and with the node 404 indicate adjacency, but it should be understood the nodes 402 and the node 404 may be within range of other nodes that are farther away.

Figure 5:
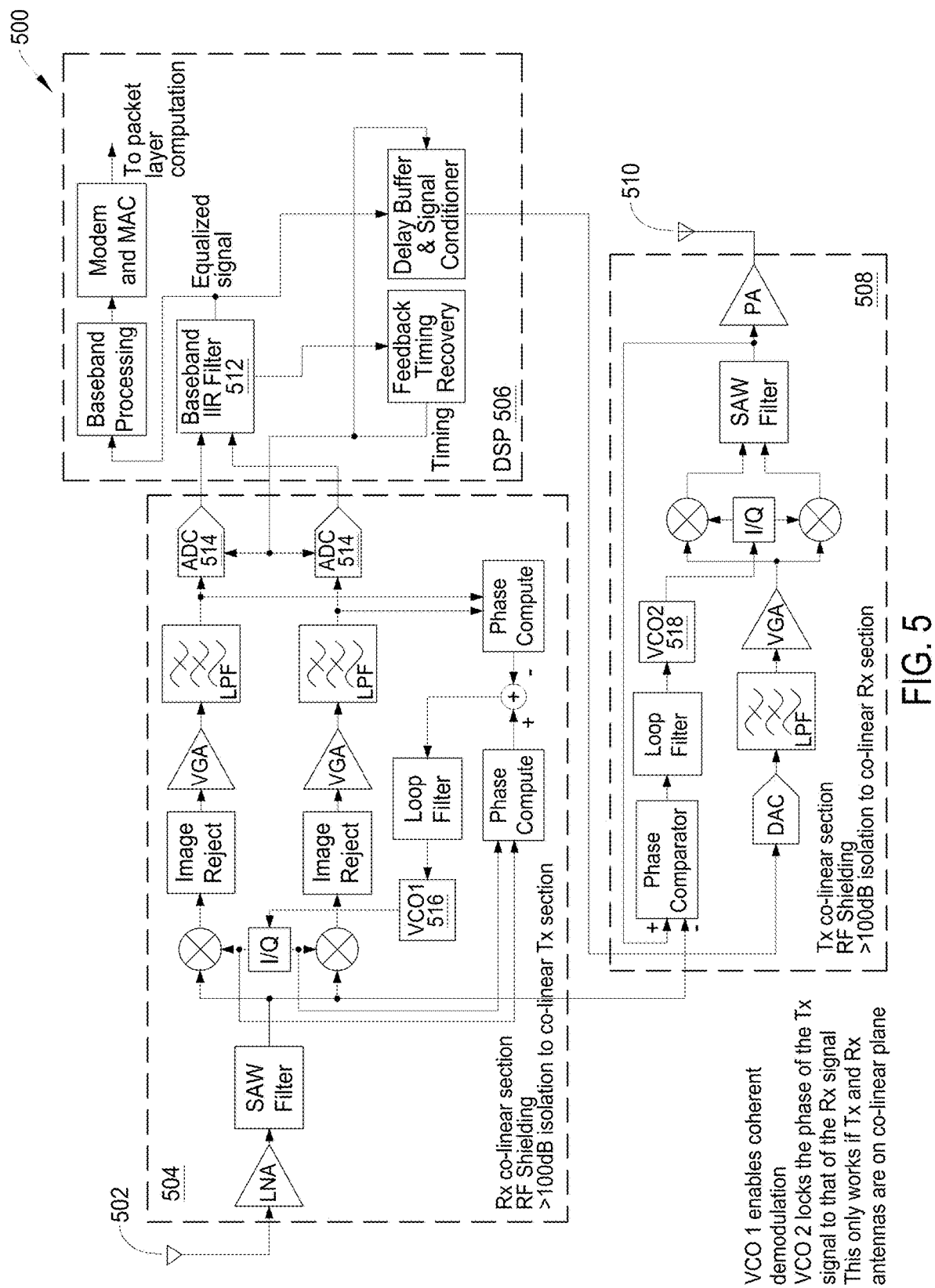
FIG. 5 is a schematic block diagram depicting an example of a node with IIR filter implementation.

FIG. 5 is a schematic block diagram 500 depicting an example of a node with IIR filter implementation. The node includes an Rx antenna 502, an Rx co-linear section 504, a DSP 506, a Tx co-linear section 508, and a Tx antenna 510. The Rx co-linear section 504 includes analog-digital converters 514 and a voltage controlled oscillator 516, and the Tx co-linear section 508 includes a voltage controlled oscillator 518. A millimeter-wave signal received by the RX antenna 502 is analog-to-digital converted by the Rx co-linear section 504, and a converted digital signal is processed by the DSP 506, where an IIR filter 512 of the DSP 506 performs co-phasing of an output signal to the input signal, and the output signal is digital-to-analog converted by the Tx co-linear section 506, and output from the Tx antenna 508.

Advantageously, since the DSP 506 is already employed for a baseband modem, the digital implementation of the IIR filter 512 comes at almost no cost. By contrast, an analogue implementation of an IIR filter may be necessarily bulky and expensive, and may need an additional set of a high-speed ADC's to compute the adaptive coefficients for the IIR filter, which greatly adds to the cost of the analogue implementation of the IIR filter.

Furthermore, because of processing delay of computation by the DSP 506, each copy of an original millimeter-wave signal (e.g., input signal) is sufficiently separated from each other and from the original millimeter-wave signal. For that reason, the copies are less likely to interfere with each other, and the delay spread of each copy is less likely to accumulate from one node to the next node. If, furthermore, nodes within a linear chain are precisely and equally spaced, which implies that the copies (and the original signal) are also precisely and equally spaced in time, then a simple tapped delay line architecture for the IIR filter 512 with the delay that is equal to the time spacing between two consecutive nodes would remove most of temporal signal correlations. This assumes that the received signal is not directly retransmitted since that would imply retransmission of all copies of the original millimeter-wave signal emanated by all nodes that came before the current node which would greatly complicate the equalization process because the continuous accumulation of the successive copies would cause the IIR filter 512 to become more and more unstable. It would also cause the delay spread to accumulate, thereby forcing the IIR filter 512 to deal with the ever increasing delay spread, thus requiring a much more complex IIR architecture to deal with both the processing delays and the delay spreads.

Figure 6:
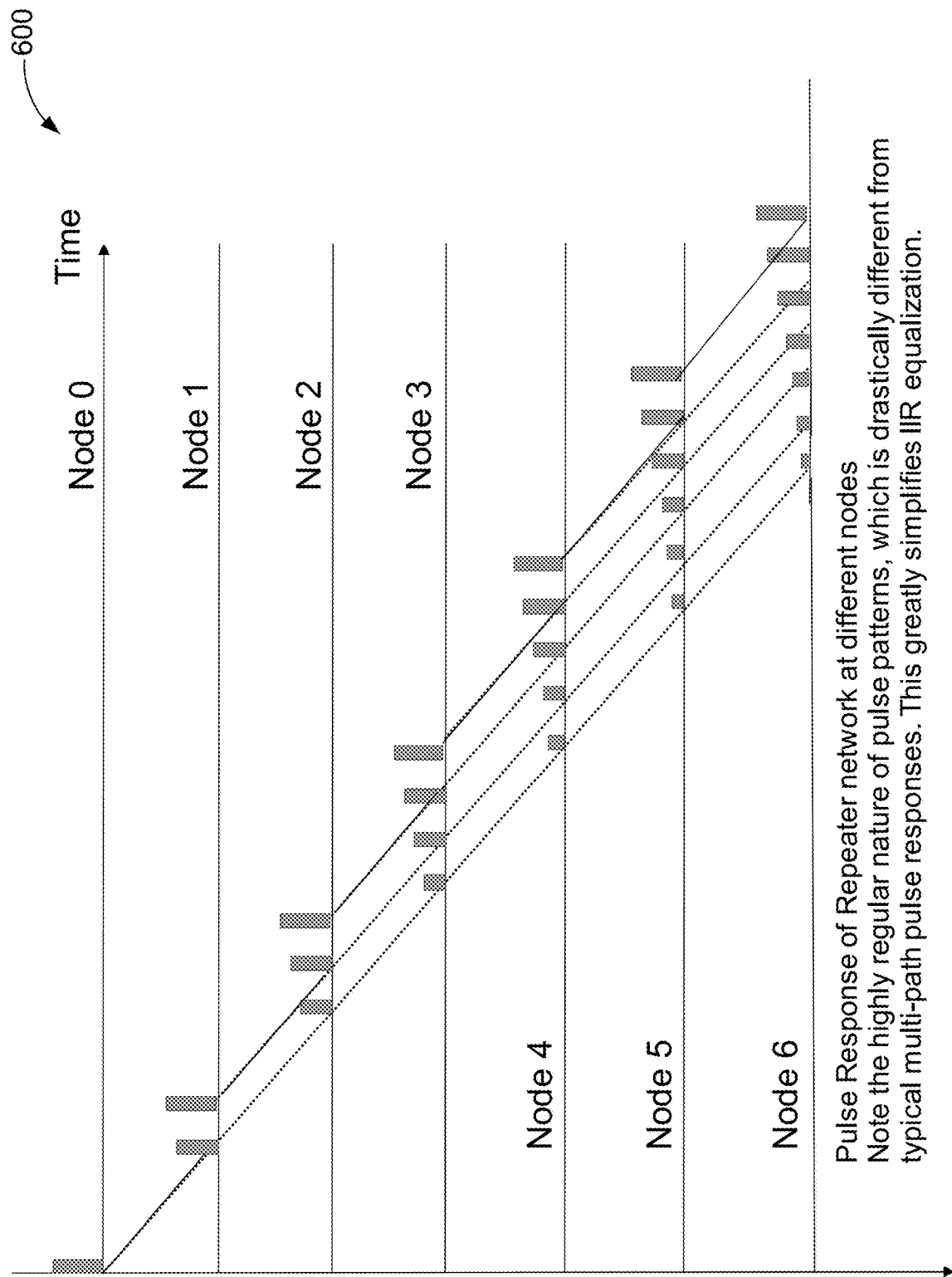
FIG. 6 is a schematic graph indicating an example of intensity of an original signal propagating through multiple nodes in a digital-IIR repeater network and intensity of copies of the original signal transmitted from successive nodes receiving the original signal.

Moreover, by retransmitting the IIR filtered signal rather than the received signal (input signal), the combined waveform takes on a clean decaying comb shape, which is much more amenable to the simple tap delay line architecture discussed above, at least in theory. However, the combination of delay spread, delay jitter, and high environmental noise (thermal plus flicker noises) and interferences would corrupt the transmitted signal if the total path-length is large. FIG. 6 is a schematic graph 600 indicating an example of intensity of an original signal propagating through multiple nodes in a digital-IIR repeater network and intensity of copies of the original signal transmitted from successive nodes receiving the original signal.

To reduce cumulative signal corruption, each IIR filtered signal generated at node 1-5 is further regenerated on its symbol level after demodulation and then reshaped and re-modulated for retransmission. As long as the symbol level decision (slicing) is correct, which requires a low bit error rate (BER), the regenerated signal will be close to the transmitted original millimeter-wave signal from node 0, and the retransmitted copies will be largely unaffected by signal corruption. Since the digital-domain IIR filtering, and subsequent demodulation and symbol quantization (or more generally, symbol decision where the decision process could be hard such as vector quantization, or soft like maximum likelihood decision whose output is forwarded to a soft forward error correction (FEC)) are already a part of the baseband decoding process, the regenerated symbol can be tapped directly from the output stream of the relevant stage of the baseband demodulation and decoding process. In effect, the symbol regeneration is free for the taking, and additional DSP processing may not be needed. The advantage of using the regenerated symbol for retransmission is that the regeneration process largely removes signal distortion and corruption due to noise, interference, delay spread, etc. as long as the symbols are correctly detected, which is to a large extent true in a very low BER environment. The regeneration improves BER for all downstream nodes by preventing downstream error propagation. However, a symbol decision error will propagate downstream, which has the potential to increase BER for all downstream nodes. Thus, like all decision-based equalization techniques, the digital-domain IIR equalization discussed in this paper is a nonlinear equalization technique and exhibits extremely a nonlinear behavior. On the other hand, even though a well-constructed linear equalizer can reduce inter-symbol interference (ISI), the regenerative equalization may actually cause worse error propagation when the BER is sufficiently high.

At a millimeter-wave frequency range (e.g., ~60 GHz), even a relatively small phased array can have an extremely narrow beam width. This leads to two important simplifications. First, only a single relay chain needs to be considered for the IIR process since the interference from adjacent linear chain is practically negligible. Second, the very narrow beam width and the negligible contribution from diffraction effect mean that multi-path fading can be ignored. This makes determination of magnitudes of IIR coefficients extremely simple because the magnitudes follow from the inverse square law of the free space propagation multiplied by the exponential decay characteristics of atmospheric absorption. The atmospheric absorption has a small dependence on the water vapor content in the atmosphere and needs to be monitored to obtain the IIR coefficients in real-time. The phases of the IIR coefficients, however, are extremely sensitive function of the exact distance between the transmitting and receiving nodes, since even a 2.5 mm uncertainty in the distance between network nodes could mean a total phase uncertainty even though any possible uncertainty in the magnitude of the IIR coefficient is entirely negligible.

The complex angles associated with the tap weights of the IIR filter become identically zero when the retransmitted signal is exactly in phase with the phase of the free propagating carrier wave. This can be accomplished with a carrier phase acquisition phase to lock the local oscillator's phase (and frequency), and then using the phase-locked local oscillator to modulate the signal to be retransmitted. However, care must be given to account for the phase difference between the modulation stage and the transmitting antenna, as well as the difference between the free propagating carrier wave at the receiving and transmitting antenna. This would be less of a problem if the RX and TX antennas and RF electronics are all embedded within the same substrate.

However, the 100 dB isolation requirement between RX and TX may render it unrealizable.

It is clear that carrier phase acquisition, or recovery, is essentially for success of the aforementioned method. Carrier recovery together with symbol-clock recovery must be correct in order to demodulate the symbols and recover the transmitted information. A symbol clock could be at the right frequency, but at the wrong phase the demodulation would still be unsuccessful. However, millimeter-wave devices tend to have much higher phase noises which makes phase and clock recoveries difficult. Fortunately, due to recent advances in millimeter wave technologies, existing millimeter-wave frequency range (e.g., 60 GHz) transceivers are already equipped with fairly accurate carrier recovery mechanism to enable the receiver to properly demodulate higher quadrature amplitude modulation (QAM) signals. QAM demodulation requires accurate frequency and phase synchronizations to properly align I and Q axes. Any error in carrier frequency estimation would cause the received signal constellation to rotate continuously in the receiver's I-Q plane, and the estimation error would rotate the received signal constellation relative to the assumed I-Q axes. Higher QAM such as 32 QAM or 64 QAM have relatively large constellations, hence even a small phase error would lead to a large error vector, which makes technologies attained by such transceivers particularly remarkable.

In view of the above issues, in some embodiments, to ensure that the retransmitted signal and the received signal are in phase with each other, the RX chip and the TX chip are placed on the same plane and integrating the respective antenna with the RX and TX chips.

In some embodiments, to ensure the in-phase state of the retransmitted signal and the received signal, the same local oscillator (LO) is used for modulation and demodulation. When a second LO (e.g., the VCO 518) is employed for TX, while keeping the RX LO (e.g., the VCO 516) the same, then it would be possible to use the TX LO to synchronize the phases between RX and TX. To ensure proper phase synchronization, the phase detector for the second LO measures the relative phase between the RX signal and the TX signal measured at their respective center feed points, and the phase error signal (from the second phase detector) is used to control the VCO through the normal phase locked loop (PLL) mechanism. The main difference between the above approach and a traditional PLL approach is, instead of monitoring the relative phase between the external clock signal and the LO clock signal, monitoring the relative phase between the input clock signal and the output signal where the output signal is driven by the second LO. It is noted that the phase shift between the 2nd LO clock signal and the output signal is already accounted for in the phase error signal, and therefore there is no need to estimate the phase compensation needed for the desired signal synchronization.

In some embodiments, to ensure the in-phase state of the retransmitted signal and the received signal, a compensation phase of each node is iteratively determined by performing a linear search (1-D search) first for the second node (node 1) which receives a beacon signal from the first node (node 0), and then the compensation phase of the third node (node 2) after the phase of the second node has been determined, and so on. Advantageously, linear search is a very efficient well established technique, which can find a fairly accurate answer typically within a few tries. The objective function used with each iteration can be taken to be the signal correlation after decimation to reduce computation requirement.

Once the in-phase requirement is satisfied for every node in a propagation chain, all nodes can retransmit coherently, which in effect turns those nodes into a giant one-dimensional phased array. The IIR weights now become: (1), (1, ½), (1, ½, ⅓), (1, ½, ⅓, . . . , 1/n), . . . if atmospheric absorption is ignored, or, more generally: (1), (1, a/2), (1, a/2, $a^2$/3), . . . (1, . . . , $a^{n-1}$/n) since the IIR coefficients are known except for an atmospheric absorption factor, which can be easily measured, any additional adaptation, or learning, is unnecessary so long as all nodes are within light of sight (LOS). If any particular node or nodes are offline, the corresponding IIR weight(s) can simply be set equal to zero. It can be shown that all such IIR filters are numerically stable, irrespective of how many nodes are in the linear chain. This avoids a complicated process of root manipulation to ensure stability of the adaptive IIR equalization filter which makes it difficult to extend the adaptive approach to much more than a dozen of nodes.

The simplicity of the IIR equalization approach is also amenable to fast DSP computation which can drastically reduce computational load of a DSP. For cases where LOS conditions cannot be completely satisfied, an adaptive FIR (finite impulse response) filter could be used in conjunction with the aforementioned IIR filter to perform partially adaptive multi-node equalization. Such adaptive approach does not incur stability issues since FIR filter is always stable.

It should be noted here that if the nodes are not substantially regularly spaced, then the corresponding digital-domain IIR filter may become far more complex, requiring far more tap weights than the number of nodes. For the same reason, if the phase synchronization is not enforced, then the corresponding digital-domain IIR filters may become far more complicated, requiring complex adaptive approach to determine the complex phases of the tap weights. This is especially true when the position of each node cannot be maintained to within a millimeter since even a 2 mm movement can lead to a phase shift of 144°.

In a way, the digital-domain IIR equalization process is similar to how a RAKE receiver works in code-division multiple access (CDMA). In CDMA, a RAKE receiver attempts to collect dominant time-shifted copies of the original signal by providing a separate correlation receiver for each of the multipath signals. The correlator outputs are then time-shifted and combined to achieve enhanced signal by coherently aggregate and merge the signal energy associated with each time-shifted version to improve the signal to noise ratio (SNR). The gain in SNR is called a RAKE gain. Although the propagation environment considered for this invention has nothing to do with multi-path fading, the coherent radiation from each node can still be accurately described as a time-shifted copy of the original signal, and the phase locking mechanism for each node is similar to the correlation mechanism, because the relative phase information from a RAKE finger is contained within its output. In addition, although the coherent combining of the RAKE outputs is more akin to a FIR filtering, any false image of the FIR mechanism resulting from the RAKE operation is largely removed by the resulting code correlation action. For a multi-gigabit 60 GHz system, however, any parallel to a RAKE operation will not work well in practice for two main reasons: First, any possible spreading ratio would be too low to suppress ISI effectively. Second, with a peak symbol rate reaching 500 MSPS (mega-symbol per second), the RAKE correlation search operations would be simply too costly given the current status of DSP technology. By placing the network nodes as equally spaced lattice points, each node will see a superposition of regularly time-shifted versions of an original signal from all nodes in its upstream. This greatly simplifies the equalization operation (one can logically consider the RAKE operation to be an equalization operation in CDMA flavor) because of the regularity of the time-shifted superposition wherein even the amplitude ratios are already known in advance.

The gain from the coherent combining of the time-shifted signals can be considered to be the analogue of a RAKE gain, but is more appropriately looked upon as an array gain, and the linear chain is nothing but a version of synthetic aperture array (or more simply, aperture array, for short). This array gain effectively increases the single antenna gain by an array factor, which, for far downstream nodes, could exceed 4 dB. The higher effective antenna gain also translates into narrower beam width, which further reduces any multi-path effects.

2. Clocking Distribution, Slips, and Synchronization

Figure 7:
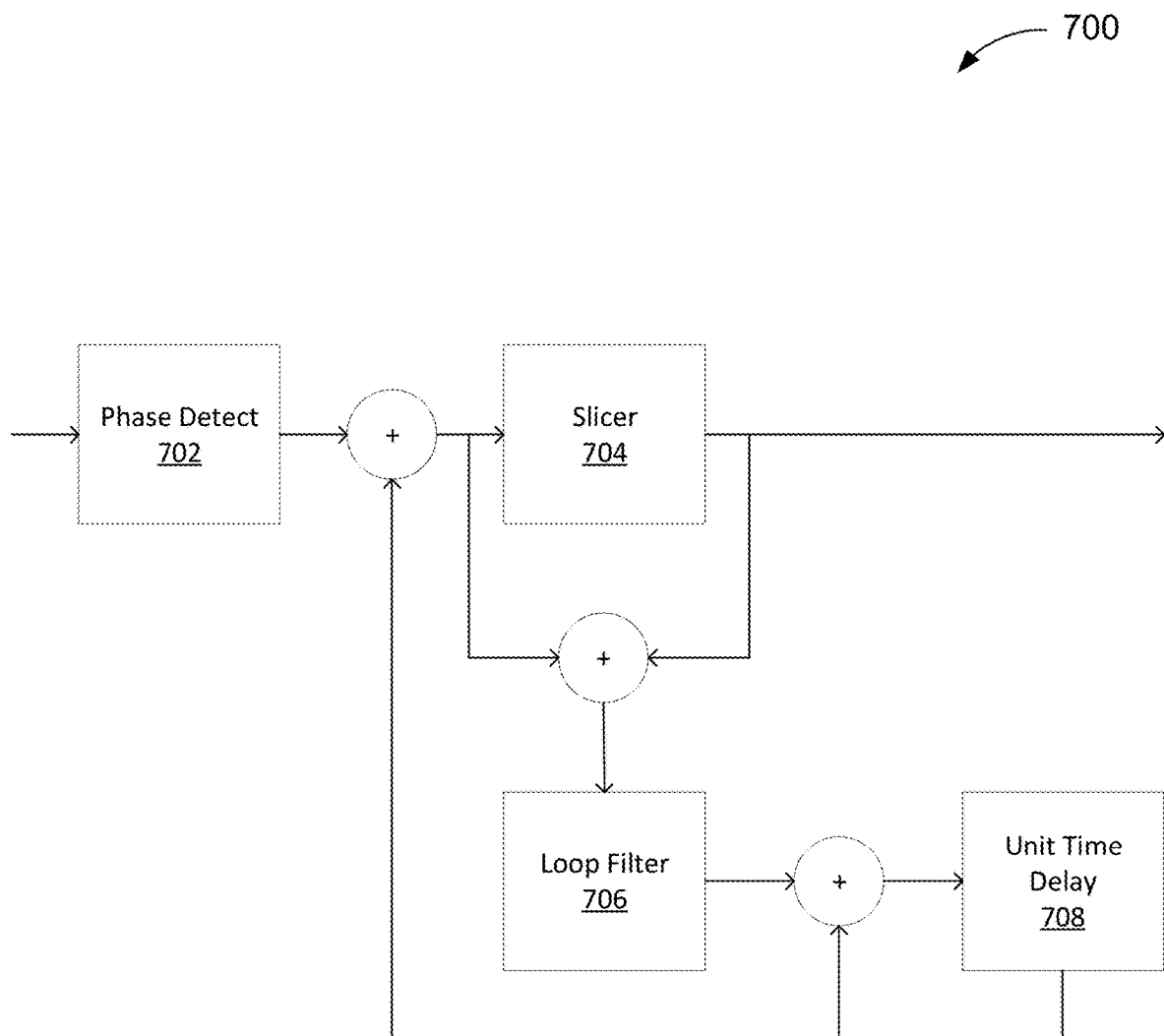
FIG. 7 is a schematic block diagram of an example of a PLL module according to some embodiments.

Ideally, carrier recovery and symbol clock synchronization should keep every node within a linear node chain fully synchronized (carrier frequency and symbol timing) and appropriately phased. However, since a PLL relies only on a loop filter for averaged phase detection errors, the PLL may not sufficiently prevent clock slips. FIG. 7 is a schematic block diagram 700 of an example of a PLL module according to some embodiments. The PLL module in FIG. 7 includes a phase detector 702, a slicer 704, a loop filter 706, and a unit time delay 708. In operation, a signal input to the phase detector 702 is output therefrom and the output signal is combined with an output of the unit time delay 708 and the combined signal is output to the slicer 704. Input to and output from the slicer 704 are combined, and the combined signal is input to the loop filter 706. Then, an output of the loop filter 706 is combined with the unit time delay 708, and the sum is provided to as to be combined with the output of the phase detector 702.

According to some embodiments, the PLL module 700 does not actually detect a frequency of a signal directly. Instead, the phase is directly detected by the PLL module 700, and the frequency is inferred from the detected phase. Furthermore, the relation between frequency and phase must satisfy Heisenberg's uncertainty principle in that they cannot be both defined to arbitrary accuracy. On the other hand, any minute difference in frequencies between a LO and the reference clock source will cause a phase error to increase over time until the negative feedback voltage controlling the VCO begin to kick in to pull the LO frequency closer to the reference frequency. The exact phase/frequency dynamics depends on both the feedback gain and the bandwidth of the loop filter 706. A low feedback gain together with a low corner frequency for the loop filter 706 may cause the inferred frequency to be close to the reference frequency, but at the same time also allows for higher clock slippage rate. On the other hand, a larger feedback gain and a wider loop bandwidth may provide less frequent slippages but also larger frequency excursions called reference spurs because the loop filter 706 no longer is able to attenuate the FM (frequency modulation) like excursions.

In order to maintain phase coherencies among multiple nodes, it would be unwise to allow those nodes to have its own LO clock and rely only on carrier phase recovery for synchronization (symbol timing recovery is less troublesome since even a 100 pico-second clock jitter will have little impact on symbol timing). For example, if each of the multiple node uses a crystal clock source frequency multiplied to serve as the master clock, then the synchronization process would pit one clock against another. Even when the PLL module 700 is able to lock the two clocks well enough, the static phase difference will be large unless the two crystals happen to behave exactly the same way. With a large static phase error, the phase margin becomes inadequate to minimize slippages and spurs. The situation becomes even more severe when multiple clocks need to be synchronized.

In order to address this issue, in some embodiments, a satellite GPS (global positioning satellite) clock signal is used as a master clock signal for the first node (node 0), and the remaining nodes (node 1-) primarily rely on carrier recovery to synchronize with the upstream clocks. The downstream nodes may still keep track of the GPS clock signal, but fall back on their GPS signals when a glitch occurs and the preferred carrier synchronization fails or when there is a sufficiently large clocking discrepancy so that all nodes should be notified immediately and coordinated for re-clocking. According to the use of the GPS clock signal selectively by the initial node, the downstream nodes will not "fight" the master clock with their own local masters, and therefore the clock slips as well as static phase errors can be significantly reduced.

3. Out-of-Band Control Plane

An out-of-band network can be an earlier generation network, which the 4G network is soon to be, with sufficient data transport capacity to relay information to mesh network nodes for real-time or time-varying coefficients and other network dimensional parameters enabling a relatively precise determination of the location of the mesh network nodes. Relatively precise is intended to mean having greater accuracy than GPS or within 10 cm.

Figure 8:
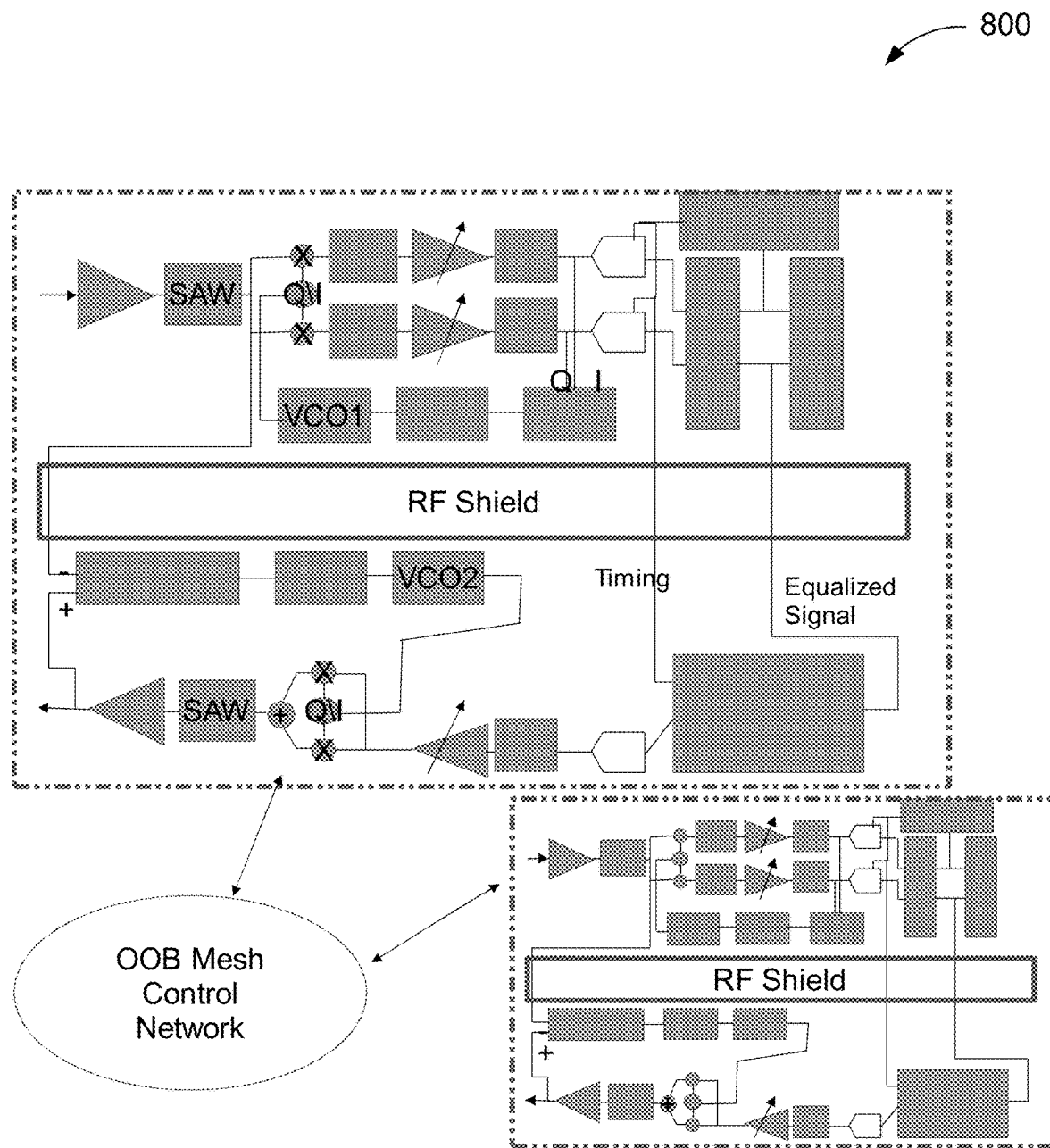
FIG. 8 is a schematic block diagram illustrating an example of modules in a node that can be employed for out-of-band (OOB) control plane/network.

The digital-IIR repeater network as described above is best suited for ultra-high-speed data transmission efficiently. FIG. 8 is a schematic block diagram 800 illustrating an example of modules in a node that can be employed for out-of-band (OOB) control plane/network.

During normal operations, the high-speed data is transmitted and relayed in one direction for a single data communication sequence. In order to coordinate nodes in the digital-IIR repeater network to perform the phase and symbol clock synchronization described above, and other routine and emergency management tasks, the digital-IIR repeater network may dedicate a certain percentage of the data bandwidth to such management tasks either in a time division or frequency division fashion. In the alternative, the digital-IIR repeater network could rely on a much slower out-of-band overlaying network to perform these management tasks. An issue with the in-band control plane is that the node requires the in-band channels to be able to reach other nodes in the (two-dimensional) network, which means that more complex hardware and firmware are needed to provide multi-way direct communications. However, because the millimeter-wave frequency range (e.g., ~60 GHz) of the digital-IIR repeater network is limited, in order to communicate to a distant node, some sort of relaying is still needed, which further complicates the issue.

Another issue with the in-band control plane approach is that even though the digital-IIR repeater network can be designed for fault tolerance by enabling it to reroute the relaying path if some links become inoperative, such self-healing capacity is inherently limited and thus cannot cope with a severely impaired network where a fraction of the upstream nodes become inoperative at the same time. When this simultaneous inoperability of upstream nodes happens, the in-band control also gets knocked offline, and thus means of communicating and coordinating with the digital-IIR repeater network may be lost. The inability to monitor, coordinate, and control the underlying digital-IIR repeater network would essentially force communication offline.

In order to address these issues, in some embodiments, a lower-frequency longer-range wireless network (secondary wireless network) is used as an overlay network for the digital-IIR repeater network (primary wireless network). This out-of-band control network, optimally designed as a separate mesh network with much higher degree of interconnectivity, can provide a much higher resiliency and availability so that the out-of-band control network can maintain full connectivity even when the digital-IIR repeater network is severely impaired.

Such an out-of-band control network (secondary wireless network) does not need to have high-speed capability if only monitoring and control functions are needed. In a specific implementation, however, it would be desirable to have a peak link speed in excess of 100 Mbps, so that the out-of-band control network can take over the data transport to provide a temporally bridge for a small subset of links in the digital-IR repeater network when the digital-IIR repeater network is so damaged that it can no longer find a new route to completely restore data network connectivity for the impaired old route. Bridging by the lower-speed out-of-band control network can drastically cut down on data network throughputs along certain route(s). Even though a portion of the network clients would see a huge drop in data speeds, it would still be better than if their data network become totally inaccessible.

4. Millimeter-Wave Frequency Range MIMO and Mobile Multiple Access Applications

Figure 9:
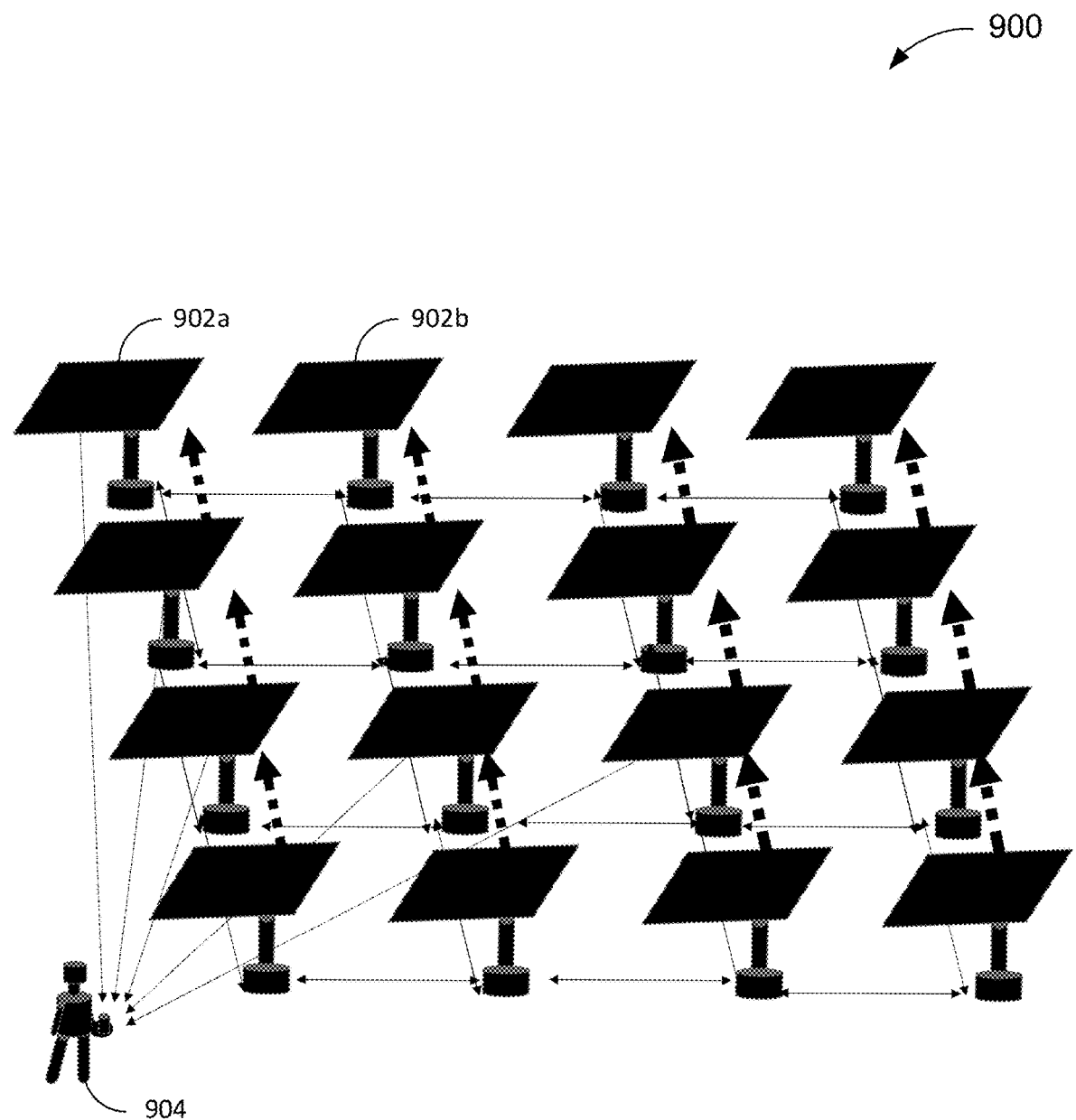
FIG. 9 is a diagram illustrating an example of an MIMO architecture that can be implemented over a geographically dispersed area with a digital-IIR repeater network.

MIMO (multiple-input-multiple-output) architecture is typically designed for lower frequency RF bands (e.g., UHF, SHF). According to MIMO, MIMO provides enhanced communications performance on multiple manners, including as beam forming, which improves effective antenna gain and reduces mutual interferences, same frequency reuse, which creates multiple parallel pipes using the same frequency to multiply the capacity of a radio link, and interference cancelling, which creates a null or a low antenna cone along a particular direction to suppress the strong interference coming from the particular direction. FIG. 9 is a schematic diagram 900 illustrating an example of an MIMO architecture that can be implemented over a geographically dispersed area with the repeater network. The MIMO architecture in FIG. 9 includes a repeater network including a node 902a, which is connected to a gateway, a plurality of repeater nodes 902b, and a wireless mobile unit 904 carried by a user. The wireless mobile unit 904 has multiple antennas that are configured to communicate with different nodes in the repeater network.

More advanced MIMO such as MU-MIMO (multi-user MIMO) can further multiply the radio link capacity by using the so-called spatial division MIMO or spatial division multiple access (SDMA) which enables users to transmit signals at the same time and frequency to communicate to the same base station at the same time by taking advantage of their unique spatial signatures.

Most MIMO technologies are applicable primarily in high multi-path fading environment. This is because in a MIMO system, a multiple-antenna-equipped transmitter (e.g., the wireless mobile unit 904) sends multiple streams through its multiple built-in antennas, and on the receiving end (e.g., the repeater network) likewise is equipped with multiple receiving antennas. If the number of transmitting antennas is $N_I$ and the number of receiving antennas is No, then the channel propagation matrix, which characterizes the $N_I \times N_O$ propagation paths, can be expressed as a $N_I \times N_O$ matrix. In order for the MIMO to work effectively, the conditionality of the channel matrix plays an important role. The channel matrix is well-conditioned when the square matrix formed by the product of $N_I$ and $N_O$ with its hermitian conjugate has at the least a number of eigenvalues which are finite (not exponentially small). For those eigenvalues, the corresponding eigenvectors can be considered space-time codes which can be used to transmit data; the same way that CDMA uses codes to transmit data. The main difference, aside from the fact that the codes in CDMA are temporal codes whereas in MIMO the codes are spatial-temporal codes, is that those eigen-codes in MIMO are theoretically mutually orthogonal and are therefore are not subjected to inter-code interference which severely limits CDMA's data capacity.

The efficiency of the MIMO in carrying data can be seen from the following example. Here, it is assumed that a 4×4 MIMO is established with 4 TX antennas and 4 RX antennas. If the channel matrix for this 4×4 system is reasonably well conditioned so that 3 of its eigenvalues are finite, then it would be possible to create 3 orthogonal channels (or "virtual wires") using the same frequency band, for a 3 times frequency reuse. In general, the magnitude of the eigenvalue is directly related to the free-space loss associated with its eigen-code, wherein if a particular eigenvalue is so small that the final SNR is well below unity, then it would not be useful for it to transmit data.

In a typical MIMO implementation, both the multiple TX antennas and the multiple RX antennas are closely spaced. This is especially true for a mobile handset where there simply is not a lot of space to accommodate multiple antennas except to pack them closely. If the antenna spacing is much smaller than the distance between the TX site and the RX site, then in a LOS environment, all the channel matrix elements are almost identical in values. Under these conditions, the channel matrix may be extremely ill-conditioned and there may be only one dominant eigenvalue, which means that both the TX antennas and the RX antennas may simply act like a single antenna (with array gain). However, in an environment where there are no dominant LOS path between the TX device and the RX device, then the individual propagation, even coming from two nearby antennas, can take very different paths, hence the individual elements of the corresponding channel matrix can be quite random. Such matrix is typically well-conditioned and can support multiple orthogonal channels.

For the millimeter frequency range (e.g., ~60 GHz) of the repeater network, both diffraction and reflection may play negligible roles in data propagation. The diffraction and reflection, together with the narrow beam width, essentially rules out the contribution of multi-path fading to the channel matrix. As such, it would be impossible to use MIMO the same way as it is used in lower frequency bands to enhance data capacity. However, it would be feasible to take advantage of the synthetic aperture array characteristics of the repeater network to transmit and receive signals from multiple nodes in the spatial array. In this scenario, it is no longer true that the antenna spacing is much smaller than the distance between TX and RX. In fact, in general, the reverse is true. Now imagine that the aperture array as a whole is the equivalence of a very large multiple antenna base station, then there is still the question of whether a small mobile handset will have enough space to accommodate a plurality of tiny antennas so that they all have distinct characteristics. If all handset antennas have almost identical RF characteristics, then they are mathematically equivalent to a single mobile antenna, in which case, it would correspond to a N×1 or 1×N MIMO architecture, which would permit beam forming, but no multiple spatially orthogonal channels are created, hence no SDMA.

According to some embodiments, in order to address this issue, antennas of the wireless mobile unit 904 that is configured to connect to the repeater network are multi-directed whereas nodes 902a and 902b of the repeater network are used as multiple antennas of a synthetic-wide area base station in the MIMO architecture as depicted in FIG. 9. In a specific implementation, for the antennas of the wireless mobile unit 904, instead of using a single 4×4 planar phased array, which would provide a narrow beam width in a normal direction, a multitude of 2×2 planar arrays are used with each planar array being directed to a different direction.

Figure 11:
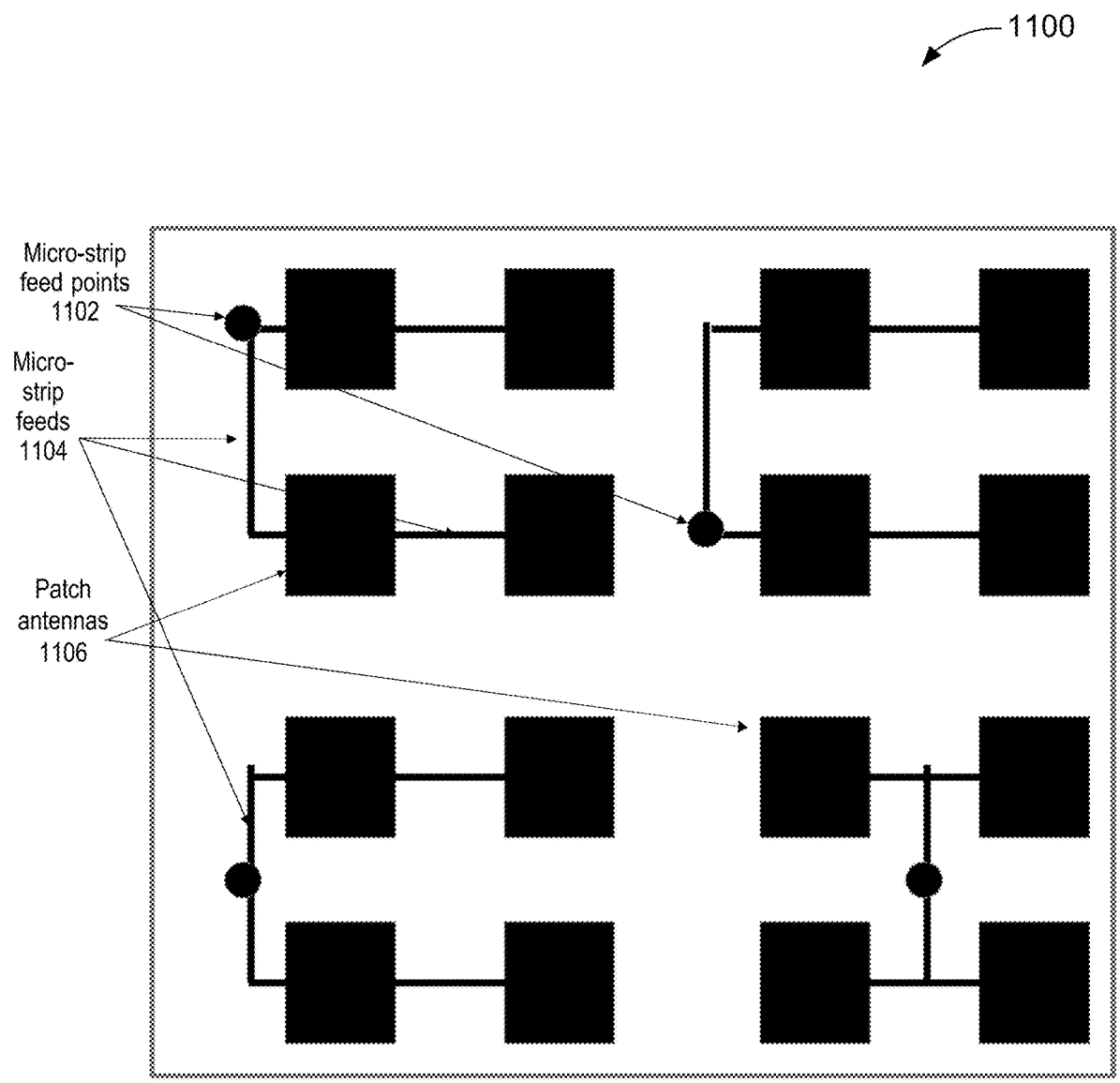
FIG. 11 is a diagram of an example of a MIMO mobile antenna with four 2×2 modules.

FIG. 11 is a diagram 1100 of an example of a MIMO mobile antenna with four 2×2 modules. In the example of FIG. 11, each 2×2 module includes four patch antennas 1106 interconnected by micro-strip feeds 1104 and micro-strip feed points 1102. By changing the feed points, each patch module will have its main lobe pointed at a different direction owing to the differing phase relationships among the individual patches within a single patch module. It is also possible to create circular polarization for each 2×2 module by employing two orthogonal feeds per module instead of a single feed per module as shown in the example of FIG. 11. For 60 GHz bands, each patch measures around 3 mm×3.3 mm, which is roughly half the EM wavelength of the dielectric substrate. The feed lines are of the order of a wavelength but the lengths can be adjusted so the requisite phase differences between patches are maintained.

In a specific implementation, the directional angles are separated by the half-beam width of the individual 2×2 phased array, so that there is considerable overlap in solid angle between any adjacent phased arrays. Furthermore, the linear polarization vectors between adjacent phased array are also made to be nearly perpendicular to each other, and then it becomes obvious that different phased array will tune to different direction of propagation as well as the direction of polarization, wherein the channel matrix is rendered well-conditioned to permit efficient SDMA.

It may not be sufficient to rely only on antennas with multiple directional normal or polarization to ensure a well-condition behavior. For example, if one were to use only a single node equipped with multi-directional antennas for the base station instead of a multitude of nodes, then it can be shown that the resulting channel matrix can be factorized, which makes the matrix highly singular and ill-conditioned. Factorization is not possible when there are more than one node for the base station.

An additional benefit of the mobile antenna configuration in the embodiments is that it can transmit/receive millimeter waves from a wide range of directions, in sharp contrast with a single 4×4 phased array that has higher gain but can receive signal in only a very narrow direction. Although each 2×2 array has far less gain (and therefore wider beam angle), the combined MIMO gain more than compensate for the reduction in single antenna gain. It is apparent that a particular implementation of the mobile antenna configuration in the embodiments can overcome one of the biggest obstacles in applying the millimeter-wave frequency range for mobile applications. For lower frequency bands, where free space path losses are far smaller, the wireless mobile devices typically are equipped with low-gain omnidirectional antennas. The employment of multiple small phased arrays also provides high antenna diversity and redundancy not found in current cellular mobile handsets.

Another major issue to apply the millimeter-wave frequency range (e.g., ~60 GHZ) of the repeater network to mobile communications is the need to constantly stay within LOS of the base station antennas to connect. In some embodiments, this issue is solved by having a dense repeater network where each node within the network comprises a fair number of high gain phased arrays pointing every which way. This provides a dense coverage in such a way that any mobile handset will be at the LOS path of at least a few nodes. In fact, since all those radio beams share the same frequency, it is almost as if those multitude of beams converging on (or diverging from) a particular handset came from a high multi-path type of diffraction/reflection. This makes ubiquitous coverage possible for the millimeter-wave frequency range.

5. Multiple Access in Millimeter-Wave Frequency Range by Beam Hopping and Arrival Angle Estimation Another major advantage of employing the repeater network as multiple antennas of a synthetic wide area base station is that the repeater network already takes care of a ultra-speed backbone needed to feed data to individual nodes. A further advantage is that all nodes in the network already have well-synchronized clocks, which makes it feasible to produce coherent beam from disparate nodes. It should be remarked here that the repeater carrier phase synchronization primarily provides a reference phase for each node to facilitate high-speed data repeating operation. For beam forming and SDMA operations, an offset phase may need to be introduced for each antenna for each intended beam direction. The beam can be digitally steered simply by changing the offset phase for each antenna (within a single node). To enable parallel backbone data relaying and MIMO SDMA operations at the same time is feasible through frequency division by using a portion of the millimeter-wave frequency spectrum (e.g., ~60 GHz) for SDMA mobile operations and the remaining spectrum for backbone operation. This obviates the need to provide costly fiber backbone to ferry the data back and forth.

Even with SDMA, the number of mobile units that the network can support simultaneously is still fairly limited, bearing in mind that a N×M MIMO (N is the number of network nodes in LOS of a mobile unit, and M is the number of discrete antennas for the mobile unit) can support at most min (N, M) simultaneous conversations within the same frequency band. For example, if M is 6 to provide true omnidirectional communications, and N>>M, then at most 6 mobile users can use the virtual wires at the same time. However, because it is theoretically possible to provide up to 100 Gbps throughput for a network-mobile link, it would be feasible to provide additional TDMA-type channel sharing by rapidly delivering a large data load to one mobile unit, and then redirect the beam to deliver another jumble data packet to another mobile user, and so on, and so forth. Beam hopping is far more power efficient than the traditional FDMA/CDMA/TDMA approach to multiple access for the simple reason that to achieve the same receiver SNR, a narrow spot beam requires far less total power because most of the radiated power is directed at the receiver, so there is no wasted power irradiating at locations which are far from where the intended recipient is. The reverse situation where a mobile unit is transmitting to the network is also true even though the reason for high power efficiency is not as obvious. In the reverse case, the network nodes form a giant coherent phased radiating array with extremely high effective antenna gain, which allows the mobile unit to use much lower power as the receiving aperture array greatly amplifies the weak signal from the mobile unit.

In the beam hopping scenario, the individual network nodes must be able to precisely determine the direction of the mobile unit in relation to the node itself for beam hopping to work. Inn some embodiments, the determination of the direction is accomplished by estimating the arrival angle of the signal from the mobile unit, which amounts to comparing the relative phases among a plurality of phased array antennas and use the relative phases to back track the mobile signal path. However, since at this point the node still does not know the direction of the mobile signal path, hence, by definition, the node antennas are not properly phased to detect the weak signal from the mobile unit (the assumption here is that the mobile unit always initiate the communications through a link connect request), therefore the node might not be able to detect the mobile unit's connect request. However, this can be solved by making the mobile link request a long (1 microsecond) pure tone to the network. Since typical symbol length is around 1 nanosecond, a microsecond tone is 3 orders of magnitude longer, which can be picked up easily by using a low pass filter (an integrator) which essentially amplifies the signal by a factor of 1000 or 30 dB for a net gain in SNR of 15 dB.

Figure 10:
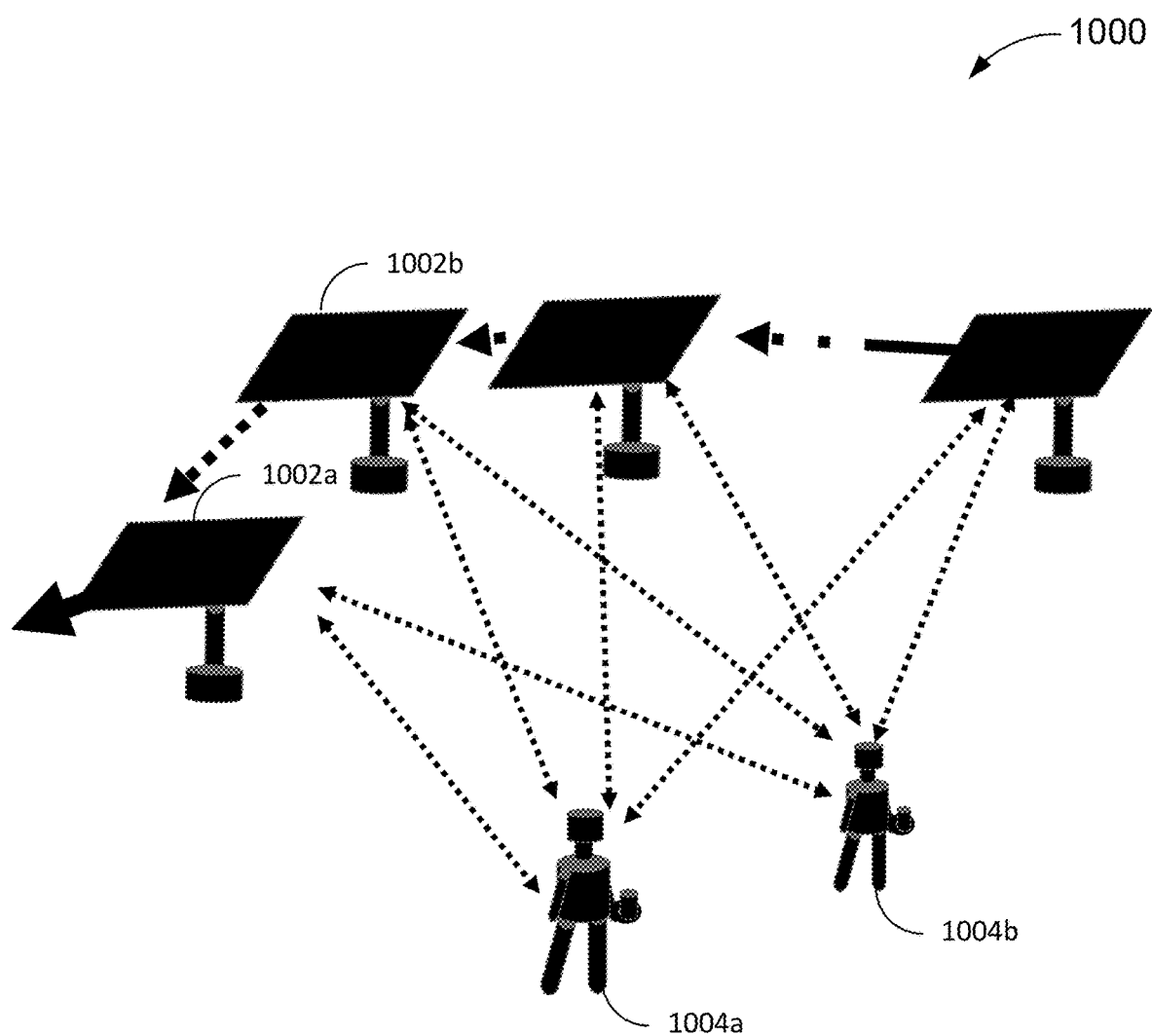
FIG. 10 is a diagram illustrating an example of an out-of-band (OOB) to MU-MIMO connection.

In some embodiments, the out-of-band control plane overlay network is used to monitor the mobile link request (assuming the mobile unit is also equipped with a low band radio) and relay its GPS location information to the relevant nodes and at the same time informs the mobile unit to aim its antennas toward the most visible node. FIG. 10 is a diagram 1000 illustrating an example of an out-ot-band (OOB) to MU-MIMO connection according to some embodiments, where multiple users 1004a and 1004b are connecting to a repeater network including a node 1002a connected to a gateway and other nodes 1002b connected to the node 1002a.

In a specific implementation, out-of-band (OOB) control channels are used in addition to GPS to locate a user once the user makes a link request. The location information is sent to all nodes of the communication network. A channel matrix is computed from location data for multiple users and eigen-vectors are computed. Location data alone may not determine phases accurately because a few mm error can change phase. Phase estimation will be discussed later.

For TX, the eigen-coefficients are sent to nodes to "precode" data to achieve orthogonal transmission for each user. For RX, the same eigen-coefficients are used. Starting from node 1, each node performs a "multiply and accumulate" operation taking the data sent from the user, multiplying it with the coefficient and adding to the data sent from the previous node, and passing that to the next node. This provides the optimal MIMO decoding for multiple users. This procedure requires the nodes to be ordered, though exact ordering does not matter.

In a specific implementation, a sub-optimal greedy algorithm may be employed. According to the sub-optimal greedy algorithm, each node uses beam-forming to steer multiple beams to multiple users. Again, the channel matrix is computed and sent to each node via the control channels. A time delay is introduced to each beam according to the distance between the node and the user. Each beam is also phase-shifted to ensure all beams from different nodes will arrive with the exactly same phase. The greedy algorithm should work about as well as the full MIMO approach when users are not with a beam width of one another.

In some embodiments, once a node steers its antennas in a right direction, proper arrival angle estimation can be performed to further refine the aim. The more accurate directional information can then be conveyed to other visible nodes and to the mobile unit to improve their aims.

Indoor penetration is yet another major issue with the millimeter-wave frequency range (e.g., ~60 GHz). It is possible to install repeater indoors to alleviate the issue. However, a typical indoor environment may contain too many obstacles that impede LOS communication. In order to address this issue, in some embodiments, the repeater network is used for a high-speed data backbone and the overlay lower-frequency mesh network is used to provide indoor connection. Since IEEE 802.11ac radio frequency signals support near gigabit speed in its MIMO mode, this is a reasonable solution.

6. Phase Difference

One way to obtain the phase difference between two nodes is to employ a pair of direct repeaters for these two nodes. The first node sends a continuous pure tone of certain duration, and the second node phase locks its local oscillator (VCO) to the incoming pure tone, and sends an amplified signal back. The first node then compares the phase difference between the original signal and the received signal from the second repeater. The phase difference between the two nodes is simply the phase difference observed by the first repeater divided by 2. This would require the first repeater to both transmit and receive signals with the same frequency. In this case it would be difficult to maintain a 100 dB isolation between TX and RX.

To address this issue, in an alternative, the second node up-converts the received signal by a predetermined amount (e.g., 2 GHz), and sends the up-converted pure tone back. Upon receiving the transponded signal from the second node, the first node can down-convert the received signal by the predetermined amount (i.e., 2 GHZ), and then compute the phase difference between the original signal and the received down-converted signal. The phase difference between the two nodes is then determined by dividing the computed phase difference by 2. Using transponders instead of repeaters can overcome the issue of isolation discussed above.

Figure 12:
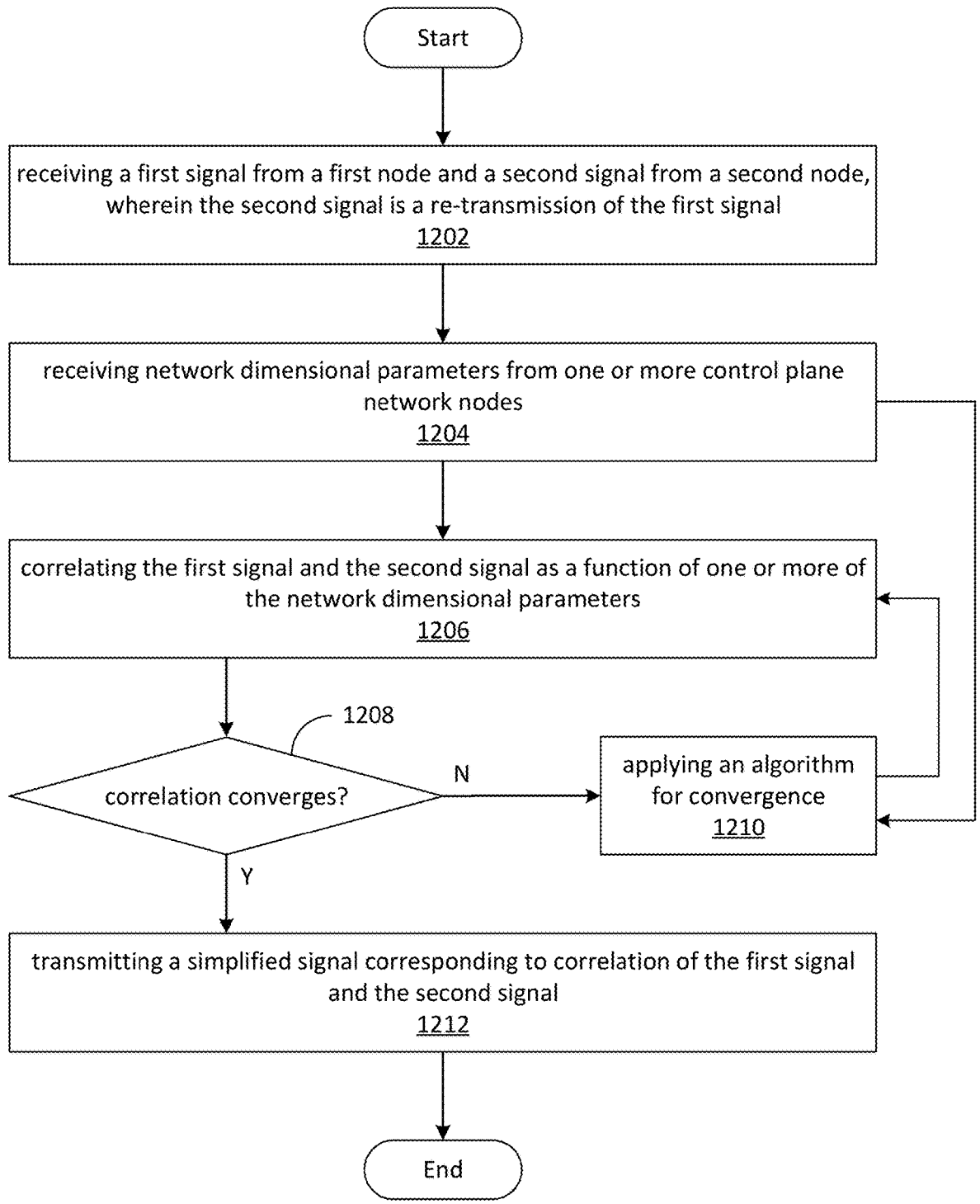
FIG. 12 is a flowchart of an example of a method of using a control plane network to provide network dimensional parameters to communication network nodes.

FIG. 12 is a flowchart 1200 of an example of a method of using a control plane network to provide network dimensional parameters to communication network nodes. In the example of FIG. 12, the flowchart 1200 starts at module 1202 with receiving a first signal from a first node and a second signal from a second node, wherein the second signal is a re-transmission of the first signal. In a specific implementation, the first node and the second node are positioned along a line and positioned with other nodes to form a repetitive pattern. Because the positioning is repetitive, computations during signal processing can be simplified. In a specific implementation, the first signal and the second signal are millimeter-wave signals in a frequency between 20 GHz and 120 GHz. In a specific implementation, the first signal is synchronized to a GPS clock signal and the second signal is synchronized to the first signal and/or to the GPS clock signal. In a specific implementation, the first signal (and/or second signal) is received over a primary wireless link when the primary wireless link is available and over a secondary wireless link when the primary wireless link is unavailable.

In the example of FIG. 12, the flowchart 1200 continues to module 1204 with receiving network dimensional parameters from one or more control plane network nodes. Control plane network nodes can be co-located with one or more communication network nodes (e.g., on the same device). Techniques described in this paper can be utilized if relative position of communication network nodes can be determined with accuracy that is slightly better than that enabled by GPS (e.g., within cm). A control plane can be used to send network dimensional parameters, which can be real-time or time-varying.

In a specific implementation, the first node transmits the first signal over a current generation network, the second node transmits the second signal over the current generation network, and the one or more control plane nodes transmit the network dimensional parameters over a previous generation network, and wherein the network dimensional parameters include real-time or time-varying coefficients. For example, if the control plane is a 4G network, the communication network may be 5G. Better control over physical placement of nodes reduces the amount of control plane information that is needed for improving network efficacy, so if the communication network is upgraded to 6G in the future, it may not be necessary to utilizing the older 5G network (the 4G network may still be considered adequate). The 4G communication network could also be used with a 3G network control plane, but the 3G network could be considered inadequate for meeting desired benchmarks. The difficulties increase as the repetitive pattern of network nodes increases in complexity (from a line to a square, to a rectangle, to a hexagon, and so forth).

In the example of FIG. 12, the flowchart 1200 continues to module 1206 with correlating the first signal and the second signal as a function of one or more of the network dimensional parameters. In a specific implementation, the function uses three network dimensional parameters: respective distances of the first node and the second node in the repetitive placement pattern or values from which the respective distances can be determined, signal processing delay at the first node and the second node or values from which signal processing delay can be determined, and attenuation associated with the first signal transmission and the second signal transmission or values from which attenuation can be determined.

In the example of FIG. 12, the flowchart 1200 continues to decision point 1208 where it is determined whether correlation converges. If correlation does not converge (1208-N), then the flowchart 1200 continues to module 1210 with applying an algorithm for convergence and returns to module 1206 as described previously. One or more additional network dimensional parameters may or may not be received and used (see, e.g., module 1204) between a first iteration of module 1206 and a second iteration of module 1206.

If, after zero or more iterations of module 1210, correlation converges (1208-Y), then the flowchart 1200 ends at module 1212 with transmitting a simplified signal corresponding to correlation of the first signal and the second signal. In a specific implementation, the third node co-phases the first signal and the second signal to generate the simplified signal. In a specific implementation, the simplified signal is a digital infinite impulse response (IIR) filtered signal implemented in the digital domain after analog-to-digital conversion (ADC).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

Furthermore, the repeater network of the present disclosure is distinguishable over prior art at least as follows.

Hypothetically, a third node has a received signal which is a composite of a signal from a first node, twice delayed and attenuated, and a signal from a second node with signal delay and attenuation. Hence the received signal at a third node is greatly distorted. Subsequent nodes following the third node therefore receive progressively more distorted signals. Such distortion has to be signal-processed using intra-node echo cancellation and similar techniques to partially compensate for such distortion. However, none of these signal processing techniques work effectively for later nodes in a long linear signal chain owing to the accumulated delay/distortion where the combination of larger and larger delay spread, attenuation, and even signal processing distort the received signal so much that no intra-node signal processing technique restores the signal effectively.

The disclosure takes advantage of the fact that, given nodes with sufficient co-linearity and approximate equidistant positioning, a collinear network chain is considered a wireless tap-delayed line, and all the tricks which are previously applied to a single board discrete active RF (radio frequency) filter implementation or to a single chip MMIC (microwave monolithic Integrated Circuit) or RFIC (radio frequency integrated circuit) design are utilized to turn the collinear node chain into a FIR or IIR tap-delayed filter. This solves any delay-spread induced signal distortion, without needing any sophisticated adaptive FIR signal processing at each node. Note that ideally, a complete cancellation of delayed signals from multiple nodes is only possible with an IIR filter, and such filtering must involve multiple nodes, so the only alternative is to inter-connect all the nodes within a single chain with a "LONG" linear waveguide with each node serving as a tap. Doing this however, precludes the need the wireless network in the first place.

Other tricks include an IIR inverse sinc filter to minimize the prominent sinc noise generated by the ADC 802. This technique again is implemented on a single board or at the least on a single device, rather than across multiple physically spaced apart nodes. This technique is particularly useful with ADC implementation.

Control plane and controller design are strictly of the in-band nature where the local controller communicates with other service nodes via a network interface unit for strictly in-band communication. In-band herein means that the high bandwidth service data and extremely low bandwidth control data share the same transport channel with Ethernet channels. Therefore, the controller is virtualized. However, even a virtualized controller which is software-emulated on another, more powerful computer, still uses the same local area network thru its virtualized network interface, so it is still an "in-band" design.

Returning to FIG. 8, the disclosure specifically employs an out-of-band control plane where each node has a non-shared non-virtualized controller on a highly redundant low-frequency (long range) secondary wireless mesh network as an overlay control plane. Such a network has a much higher degree of inter-connectivity and resilience than the main mesh network. This permits the control plane to maintain full connectivity even when the digital-IIR repeater mesh is severely impaired. Since the main repeater network relies on the control plane to detect network faults and arrange rerouting control information to instruct remaining un-impaired nodes to perform the necessary rerouting operations to "self-heal", the control plane is more robust in resisting any disruption of connectivity of the control plane signaling.

A self-organizing mesh network operating in the IEEE802.11ad mmWave environment addresses the issue of enhancing the 802.11ad standard to permit multi-hopping. To enable a multi-hop, each 802.11ad node is connected optically through fast wired links so that control information and instructions are sent through an external centralized controller to coordinate, and schedule the wireless nodes to transfer data packets between a pair of wireless nodes of source node S and destination node D, or multi-hopping from a wireless source node as a relay to a remote destination node.

In an embodiment of the disclosure, a control plane is out-of-band, as in an optical network. A wireless mesh is essentially a residential (last 30 feet) network, based on a multi-hop feature extended to more than a few hops without suffering major reduction in available throughput. In a further embodiment, the disclosed network supports thousands of hops without any perceptible reduction in overall throughput owing to an inherently super-low latency (less than 1 ns depending only on ADC latency) and distortion canceling effect of the disclosed spatial digital IIR processing.

Some embodiments include an ADC within a transceiver chip based on an ADC being a necessary component of any RF baseband signaling. A Balun design provides impedance matching between a single ended circuit such as an antenna and a differential circuit such as a coax cable, or a RF front end, and so on. To down convert the RF signal to baseband line code/digital signal, an ADC must be used.

In other embodiments of the disclosure, an ADC takes advantage of the high performance of the digital IIR filter implementation and its small size. An analogue implementation of a sufficiently high order IIR processing is unnecessarily bulky and expensive. Therefore, the addition of a low end ADC to the repeater takes advantage of the built-in FEC (forward error correction) coding of the mm-Wave signal to "un-distort" the raw received signal, further enhancing the IIR performance. Note, the preferred embodiment is not to perform any ADC conversion in order to reduce delay spread, so that large delay spread only occurs for later nodes. In the present disclosure, the digital IIR is sufficient to almost completely eliminate the delay spread induced distortion, so unwanted delayed signals don't accumulate.

Meticulous design steps are taken to acquire highly accurate carrier phase information since the entire disclosed collinear chain is almost completely phase coherent so that each node can act as a node of a very large scale linear phased array. In some instances, only a GPS receiver is used or a local timer synched to a GPS receiver is needed. There are no PLL (phase locked loop) and no phase synchronization requirements between TX and RX within the same node. Also, no iterated linear search with beacon signaling to fully "phase synchronize" the entire linear chain is required so a GPS time stamp is just that, to time stamp an observed sensor event for posterity. Such time stamping only needs to be accurate up to the second, if even that! In the event one wishes to have a much more accurate time stamp, a mechanism to do so is provided as reserved to further development of the present disclosure.

Notwithstanding, time stamp synchronization is distinguishable from carrier phase synchronization in the disclosure. The difference is similar in scope to that between the timing of a strobe light and the phase modulation of a laser beam. A narrow band laser light is highly phase coherent, whereas a strobe light is emitted from a broad band light source as almost all light sources except laser light sources don't even have a well defined phase. Therefore, phase modulating a broad band light source is difficult to achieve, and only amplitude modulation is readily possible per the strobe light.

The secondary wireless network is an overlay network always working to provide long range, highly resilient and high connectivity (higher than the primary network by many folds) low bandwidth communications for the control plane signaling. The control plane signaling does not go thru the primary network unless one uses it as a backup for the control network in the extreme case when the highly robust secondary network is shutdown for exceptional and rare cases.

Embodiments of the disclosure specifically use an out-of-band control plane, meaning each node has a non-shared non-virtualized controller which uses a highly redundant low-frequency and long range secondary wireless mesh network as an overlay control plane. Such a network has a much higher degree of inter-connectivity and resilience than the main mesh network. This permits the control plane to maintain full connectivity.

Accordingly, it is not intended that the disclosure be limited, except as by the specification and claims set forth herein. While the foregoing is directed to embodiments of the present invention, other and further embodiments of the invention may be devised without departing from the basic scope of the disclosure.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A wireless communication system, the system comprising:
   a wireless network comprising (1) a first plurality of nodes that serve as a synthetic wide area base station for communicating data with a mobile handset, wherein the mobile handset includes a plurality of antennas that point in a plurality of different directions, and (2) a second plurality of nodes that serve as a repeater network for propagating the data going to or from the synthetic wide area base station;
   wherein different ones of the first plurality of nodes are configured to communicate the data to or from the mobile handset via a plurality of wireless signals in accordance with directionality of the antennas, wherein the wireless signals share the same frequency, encode the data, and are (1) respectively received by the different ones of the first plurality of nodes from different ones of the antennas or (2) respectively transmitted by the different ones of the first plurality of nodes for reception by different ones of the antennas; and
   wherein the second plurality of nodes are configured to propagate the data via a plurality of paths through the wireless network as a plurality of millimeter wave wireless signals, wherein the millimeter wave wireless signals provide time-shifted representations of the data.

2. The system of claim 1 wherein the different ones of the first plurality of nodes are configured to respectively receive the wireless signals from different ones of the antennas in accordance with the directionality of the antennas.

3. The system of claim 1 wherein the different ones of the first plurality of nodes are configured to respectively transmit the wireless signals for reception by different ones of the antennas in accordance with the directionality of the antennas.

4. The system of claim 1 wherein the wireless network is arranged in a multiple input-multiple output (MIMO) architecture that is configured to multiply radio link capacity using spatial division MIMO or spatial division multiple access (SDMA).

5. The system of claim 4 wherein the nodes within the first plurality of nodes serve as base station nodes, and wherein the wireless network is configured to wirelessly communicate with a plurality of mobile handsets that have unique spatial signatures so that the mobile handsets are enabled to transmit at the same time and same frequency to the same base station node using the unique spatial signatures.

6. The system of claim 4 wherein the antennas comprise a plurality NI of transmitting antennas, wherein the base station nodes comprise a plurality No of receiving antennas, wherein the mobile handset uses space-time codes to transmit the wireless signals from the NI transmitting antennas to the No receiving antennas, and wherein the space-time codes are derived from a well-conditioned channel matrix that characterizes NI x No propagation paths between the NI transmitting antennas and the No receiving antennas.

7. The system of claim 1 further comprising:
an out of band control plane overlay network configured to (1) receive a link request from the mobile handset, (2) determine location data for the mobile handset in response to the received link request, and (3) provide the determined location data to the wireless network for use by the synthetic wide area base station to communicate with the mobile handset.

8. The system of claim 1 wherein the second plurality of nodes are arranged as a mesh network.

9. The system of claim 1 wherein the nodes within the second plurality of nodes serve as repeater nodes, wherein each of a plurality of the repeater nodes is configured to (1) receive multiple millimeter wave wireless signals from different nodes of wireless network, wherein the received multiple millimeter wave wireless signals serve as time-shifted versions of the data, (2) digitize the received multiple millimeter wave signals as a plurality of digital signals, (3) equalize the digital signals as an equalized signal, and (4) wirelessly transmit a millimeter wave wireless signal based on the equalized signal.

10. The system of claim 9 wherein each of a plurality of the repeater nodes is configured to equalize the digital signals by applying the digital signals to a digital infinite impulse response (IIR) filter to generate the equalized signal.

11. The system of claim 10 wherein the digital IIR filter comprises an adaptive digital IIR filter.

12. The system of claim 1 wherein a plurality of the nodes within the repeater network are positioned along a linear signal path.

13. The system of claim 1 wherein the wireless signals communicated between the mobile handset and the synthetic wide area base station exhibit a millimeter wave frequency.

14. The system of claim 1 further comprising the mobile handset.

15. A wireless communication method for a wireless network, the wireless network comprising a plurality nodes, the method comprising:
a first plurality of the nodes operating as a synthetic wide area base station for communicating data with a mobile handset, wherein the mobile handset includes a plurality of antennas that point in a plurality of different directions; and
a second plurality of the nodes operating as a repeater network for propagating the data going to or from the synthetic wide area base station;
wherein the synthetic wide area base station operating step comprises different ones of the first plurality of nodes communicating the data to or from the mobile handset via a plurality of wireless signals in accordance with directionality of the antennas, wherein the wireless signals share the same frequency, encode the data, and are (1) respectively received by the different ones of the first plurality of nodes from different ones of the antennas or (2) respectively transmitted by the different ones of the first plurality of nodes for reception by different ones of the antennas; and
wherein the repeater network operating step comprises the second plurality of nodes propagating the data via a plurality of paths through the wireless network as a plurality of millimeter wave wireless signals, wherein the millimeter wave wireless signals provide time-shifted representations of the data.

16. The method of claim 15 wherein the wireless signals communicated between the mobile handset and the different base stations are respectively received by the different ones of the first plurality of nodes from different ones of the antennas.

17. The method of claim 15 wherein the wireless signals communicated between the mobile handset and the different base stations are respectively transmitted by the different ones of the first plurality of nodes for reception by different ones of the antennas.

18. The method of claim 15 wherein the wireless network is arranged in a multiple input-multiple output (MIMO) architecture, and wherein the communicating step multiplies radio link capacity using spatial division MIMO or spatial division multiple access (SDMA).

19. The method of claim 18 wherein the nodes within the first plurality of nodes serve as base station nodes, and wherein the communicating step comprises the wireless network wirelessly communicating with a plurality of mobile handsets that have unique spatial signatures so that the mobile handsets are enabled to transmit at the same time and same frequency to the same base station node using the unique spatial signatures.

20. The method of claim 15 wherein the wireless signals communicated between the mobile handset and the synthetic wide area base station exhibit a millimeter wave frequency.

* * * * *